(12) United States Patent
Roychowdhury et al.

(10) Patent No.: US 11,729,190 B2
(45) Date of Patent: Aug. 15, 2023

(54) VIRTUAL SENSOR SUPERVISED LEARNING FOR CYBER-ATTACK NEUTRALIZATION

(71) Applicant: GENERAL ELECTRIC COMPANY, Schenectady, NY (US)

(72) Inventors: Subhrajit Roychowdhury, Schenectady, NY (US); Masoud Abbaszadeh, Clifton Park, NY (US); Mustafa Tekin Dokucu, Latham, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 374 days.

(21) Appl. No.: 16/666,807

(22) Filed: Oct. 29, 2019

(65) Prior Publication Data
US 2021/0126943 A1 Apr. 29, 2021

(51) Int. Cl.
*G06F 21/00* (2013.01)
*H04L 9/40* (2022.01)
(Continued)

(52) U.S. Cl.
CPC ........ *H04L 63/1425* (2013.01); *G06F 18/214* (2023.01); *G06F 18/2185* (2023.01);
(Continued)

(58) Field of Classification Search
CPC ............. H04L 63/1466; H04L 63/1458; H04L 63/1416; H04L 63/1433; H04L 63/1425;
(Continued)

(56) References Cited

U.S. PATENT DOCUMENTS 9,807,109 B2 10/2017 Laidlaw et al.
10,547,623 B1 * 1/2020 Han ................... H04L 63/1408
(Continued)

FOREIGN PATENT DOCUMENTS

CN 109544666 A * 3/2019

OTHER PUBLICATIONS

Deng et al., "Vulnerabilities and Countermeasures—A Survey on the Cyber Security Issues in the Transmission Subsystem of a Smart Grid", Journal of Cyber Security and Mobility, vol. 1, pp. 251-276, 2012.
(Continued)

*Primary Examiner* — Khoi V Le
*Assistant Examiner* — Michael M Lee
(74) *Attorney, Agent, or Firm* — Buckley, Maschoff & Talwalkar LLC

(57) ABSTRACT

An industrial asset may have monitoring nodes that generate current monitoring node values. A dynamic, resilient estimator may split a temporal monitoring node space into normal and one or more abnormal subspaces associated with different kinds of attack vectors. According to some embodiments, a neutralization model is constructed and trained for each attack vector using supervised learning and the associated abnormal subspace. In other embodiments, a single model is created using out-of-range values for abnormal monitoring nodes. Responsive to an indication of a particular abnormal monitoring node or nodes, the system may automatically invoke the appropriate neutralization model to determine estimated values of the particular abnormal monitoring node or nodes (e.g., by selecting the correct model or using out-of-range values). The series of current monitoring node values from the abnormal monitoring node or nodes may then be replaced with the estimated values.

11 Claims, 34 Drawing Sheets

(51) Int. Cl.
*G06F 18/214* (2023.01)
*G06F 18/21* (2023.01)

(52) U.S. Cl.
CPC ...... *H04L 63/1416* (2013.01); *H04L 63/1433* (2013.01); *H04L 63/1458* (2013.01); *H04L 63/1466* (2013.01)

(58) Field of Classification Search
CPC .................. H04L 63/1441; G06K 9/6264; G06K 9/6256; G06K 9/6284; G06K 9/6271; G06F 21/57; G06F 21/552
See application file for complete search history.

(56) References Cited

U.S. PATENT DOCUMENTS

| | | | | |
|---|---|---|---|---|
| 2018/0004941 | A1* | 1/2018 | Reinecke | G06F 21/56 |
| 2018/0157831 | A1* | 6/2018 | Abbaszadeh | G06F 21/552 |
| 2018/0159877 | A1* | 6/2018 | Holzhauer | H04L 43/08 |
| 2018/0191758 | A1* | 7/2018 | Abbaszadeh | H04L 63/1441 |
| 2018/0255091 | A1 | 9/2018 | Mestha et al. | |
| 2018/0262525 | A1* | 9/2018 | Yan | G06N 20/00 |
| 2019/0058715 | A1 | 2/2019 | Abbaszadeh et al. | |
| 2019/0068618 | A1 | 2/2019 | Mestha et al. | |
| 2019/0220374 | A1 | 7/2019 | Wei et al. | |
| 2019/0228312 | A1* | 7/2019 | Andoni | G06F 17/18 |
| 2019/0230106 | A1 | 7/2019 | Abbaszadeh et al. | |
| 2020/0042426 | A1* | 2/2020 | Ambichl | G06F 11/3466 |
| 2020/0234110 | A1* | 7/2020 | Singh | G06N 20/00 |
| 2020/0275278 | A1* | 8/2020 | Hanawa | G06N 5/022 |
| 2020/0401470 | A1* | 12/2020 | Jung | G06F 11/079 |
| 2021/0190362 | A1* | 6/2021 | Ko | G06K 9/6256 |

OTHER PUBLICATIONS

Truong et al., "A New Method Against Attacks On Networked Industrial Control Systems", Proceedings of the Ninth National Science Conference, pp. 9-16, 2017.

* cited by examiner

VIRTUAL SENSOR LOOKUP TABLE — 900

| VIRTUAL SENSOR MATRIX 910 | SIGNAL BEING ESTIMATED 920 |
|---|---|
| $C_{1,1}$ | DWATT |
| $C_{2,1}$ | TTXM |
| $C_{3,1}$ | CTD |
| $C_{4,1}$ | FQG |
| $C_{5,1}$ | CPD |
| $C_{6,1}$ | CTIM |
| $C_{1,2}$ | DWATT, TTXM |
| .... | .... |
| $C_{15,2}$ | CPD, CTD |

*FIG. 9*

| EFFECT / ATTACK | CPD | CTD | CTIM | FQG | DWATT | TTXM |
|---|---|---|---|---|---|---|
| CPD | 1 | 1 | 0 | 0 | 1 | 1 |
| CTD | 1 | 1 | 0 | 0 | 1 | 1 |
| CTIM | 0 | 0 | 1 | 0 | 0 | 0 |
| FQG | 0 | 0 | 0 | 1 | 1 | 1 |
| DWATT | 1 | 1 | 0 | 0 | 1 | 0 |
| TTXM | 1 | 1 | 1 | 0 | 0 | 1 |

FIG. 16

| INDUSTRIAL ASSET IDENTIFIER 3102 | INDUSTRIAL ASSET DESCRIPTION 3104 | VIRTUAL SENSOR IDENTIFIER 3106 | MATRIX 3108 | DESCRIPTION 3110 | STATUS 3112 | SELECTED MODEL 3114 |
|---|---|---|---|---|---|---|
| IA_2001 | GAS TURBINE | VS_01 | C1,1 | DWATT | NORMAL | |
| IA_2001 | GAS TURBINE | VS_02 | C2,1 | TTXM | PREDICTED | SUPERVISED (M_101) |
| IA_2001 | GAS TURBINE | VS_03 | C5,1 | CPD | PREDICTED | UNSUPERVISED |
| IA_2002 | ELECTRIC POWER GRID | VS_04 | C1,2 | WIND TURBINE | NORMAL | |

FIG. 31

VIRTUAL SENSOR SUPERVISED LEARNING FOR CYBER-ATTACK NEUTRALIZATION

This invention was made with Government support under contract number DE-OE0000833 awarded by the Department of Energy. The Government has certain rights in this invention.

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.), that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or catastrophic damage to a plant. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). Existing approaches to protect an industrial control system, such as failure and diagnostics technologies, may not adequately address these problems—especially when multiple, simultaneous attacks occur since such multiple faults/failure diagnostic technologies are not designed for detecting stealthy attacks in an automatic manner.

It may be important to maintain an industrial asset's functionality during an attack. For example, an operator may want a power generation plant to continue to provide electricity even when one or more sensors, actuators, etc. are the subject of a cyber-attack. It may similarly be desired to operate the asset when one or more monitoring nodes fail. Moreover, it may be advantageous to provide protection for an industrial asset without requiring redundant components (e.g., industrial control systems) and/or any major changes and/or re-design of controllers. In some cases, a virtual sensing system may get a portion of sensor measurements that are healthy and uncompromised and use that information to provide healthy estimations for the measurements of the sensors that are compromised. Since the compromised and uncompromised portions of the measurements might be any subset of the system sensors, this approach may present a combinatorial problem that requires that a substantial number of estimation models be developed and stored. As a result, this technique can require a relatively long development time frame using brute force methods.

In some approaches, a virtual sensing system may get a portion of the sensor measurements that are healthy and uncompromised and uses that information to provide healthy estimations for the measurements of the sensors that are compromised. Moreover, an unsupervised learning method can be used to reconstruct the compromised sensors from the uncompromised ones. However, such a method does not use information about the attack surface and hence may be limited in prediction accuracy. It may therefore be desirable to improve prediction accuracy by developing specific attack models based on attack data and/or combining them in a substantially real time deployable form.

SUMMARY

According to some embodiments, an industrial asset may have monitoring nodes that generate current monitoring node values. A dynamic, resilient estimator may split a temporal monitoring node space into normal and one or more abnormal subspaces associated with different kinds of attack vectors. According to some embodiments, a neutralization model is constructed and trained for each attack vector using supervised learning and the associated abnormal subspace. In other embodiments, a single model is created using out-of-range values for abnormal monitoring nodes. Responsive to an indication of a particular abnormal monitoring node or nodes, the system may automatically invoke the appropriate neutralization model to determine estimated values of the particular abnormal monitoring node or nodes (e.g., by selecting the correct model or using out-of-range values). The series of current monitoring node values from the abnormal monitoring node or nodes may then be replaced with the estimated values.

Some embodiments comprise: means for splitting, by a dynamic, resilient estimator, a temporal monitoring node space into a normal subspace and a plurality of abnormal subspaces, each abnormal subspace being associated with a different kind of attack vector, wherein each attack vector is associated with at least one abnormal monitoring node; for each attack vector, means for constructing a neutralization model trained using supervised learning and the associated abnormal subspace; responsive to an indication of a particular abnormal monitoring node or nodes that are currently being attacked or experiencing a fault, means for automatically invoking the appropriate neutralization model to determine estimated values of the particular abnormal monitoring node or nodes; and means for replacing the series of current monitoring node values from the abnormal monitoring node or nodes with the estimated values Other embodiments comprise: means for splitting, by a dynamic, resilient estimator, a temporal monitoring node space into a normal subspace and an abnormal subspace for at least one attack vector, wherein each attack vector is associated with at least one abnormal monitoring node; for all attack vectors, means for constructing a single neutralization model constrained and trained using supervised learning, the abnormal subspace, and out-of-range values for abnormal monitoring nodes; responsive to an indication of a particular abnormal monitoring node or nodes that are currently being attacked or experiencing a fault, means for automatically invoking the single neutralization model to determine estimated values of the particular abnormal monitoring node or nodes; and means for replacing the series of current monitoring node values from the abnormal monitoring node or nodes with the estimated values.

Some technical advantages of some embodiments disclosed herein are improved systems and methods to protect an industrial asset from cyber-attacks in an automatic and accurate manner.

BRIEF DESCRIPTION OF THE DRAWINGS

FIG. 9 includes a portion of a virtual sensor lookup table according to some embodiments.

FIG. 16 is a causal dependency matrix of monitoring nodes in accordance with some embodiments.

FIG. 31 is a tabular portion of a virtual sensor database in accordance with some embodiments.

DETAILED DESCRIPTION

Figure 1:
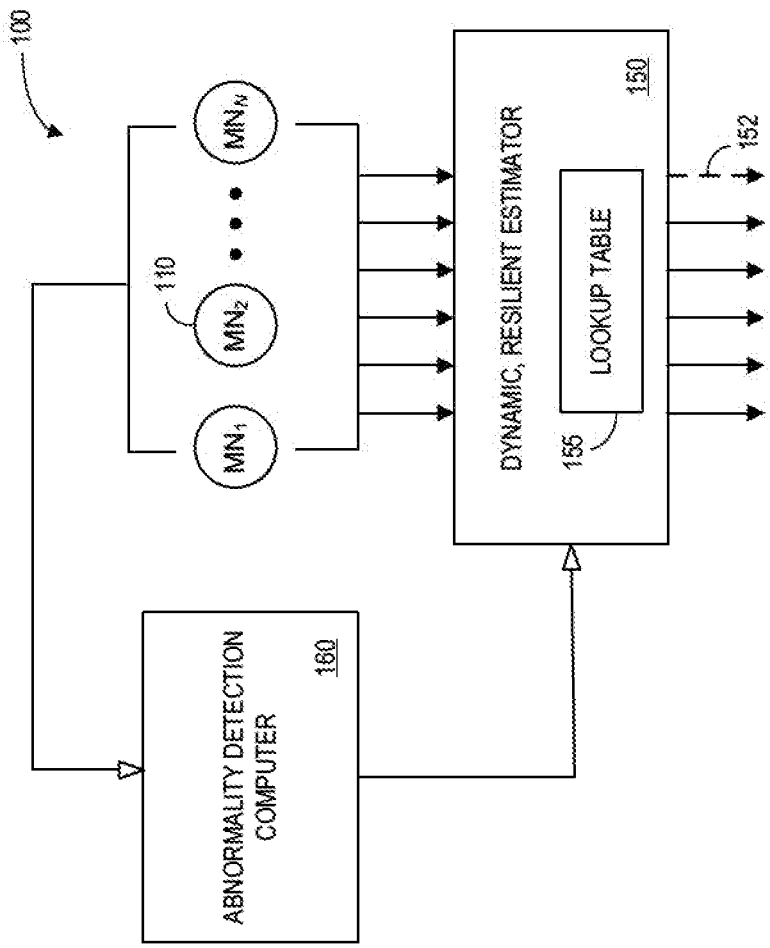
FIG. 1 is a high-level block diagram of a system to protect an industrial asset according to some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Industrial control systems that operate physical systems are increasingly connected to the Internet. Note that, as used herein, the term "industrial" might be associated with any system that is connected to an external source, such as the Internet in the case of a cyber-physical system or locally operating an air-gapped physical system. As a result, these control systems have been increasingly vulnerable to threats and, in some cases, multiple attacks may occur simultaneously. Protecting an asset may depend on detecting such attacks as well as naturally occurring faults and failures. Existing approaches to protect an industrial control system, such as failure and diagnostics technologies, may not adequately address these threats—especially when multiple, simultaneous attacks occur. It would therefore be desirable to protect an industrial asset from cyber threats in an automatic and accurate manner. In particular, an operator of an industrial asset might want to implement "accommodation" procedures such that critical functions of the asset may automatically still function even in the event of one or more cyber-attacks or monitoring node failure (e.g., by replacing unhealthy sensor node data values with virtual sensor data values based on information obtained from other, healthy nodes).

Some embodiments described herein may provide a system and method for autonomous reconfigurable virtual sensing to neutralize the effect of anomalies (cyber-attacks or faults) in the system measurements. The system may provide correct estimates of the compromised sensor measurements using the uncompromised sensor measurements, thus replacing the compromised sensors with healthy "virtual" (e.g., soft or surrogate) sensors. The virtual sensing estimator may use unsupervised learning methods to extract important features from sensor data in healthy conditions and cast an optimization problem that is solved on-line to reconstruct the attacked sensors in the underlying feature space. The method may work with various invertible features set with determined mapping from sensor-to-feature and feature-to-sensor spaces. The optimization problem may be a constrained one, in some embodiments, where domain knowledge is utilized to determine the constraints. The system may be scalable because it requires minimal knowledge of the underlying system model and possible attack scenarios. Moreover, the identification of the dominant features of the sensor data may be done off-line, in an unsupervised way, using only normal operation data (that is, labeled data for attacks might not be required). The system may assume that a critical subset of measurements is reliable under various attack conditions, and these measurements may be enough to exercise a system predictive model for the rest of the sensors.

Some embodiments provide a system and method for autonomous, reconfigurable virtual sensing to neutralize the effect of anomalies (e.g., cyber-attacks and/or faults) in system measurements. Based on offline training data and potential attack surfaces, neutralization model(s) may be developed for different (classes of) attack scenarios that are deployed to provide correct estimates of the compromised sensor measurements using uncompromised sensor measurements. Note that only knowledge of the attack surface is needed to train the models on normal data; actual attack data is not required (although the availability of such data may improve performance). However, knowledge of an attack surface and/or attack catalogue may be necessary to determine a training regime of the models to keep the problem tractable. Two complementary approaches are described along with a combination of approaches that might be chosen to strike an optimal prediction accuracy versus memory requirement tradeoff. In the first approach, an individual model is trained for each attack vector in the catalogue, and the appropriate model may be selected during an attack based on upstream localization model recommendations. In the alternative approach, a single model is trained, and attack information is passed by coding it differently as compared to normal operational values of the sensor. Thus, during an attack, based on the recommendation of a localization module, compromised sensor values are coded appropriately before being passed to a neutralization module (which thereby helps the model perform appropriate reconstructions).

FIG. 1 is a high-level architecture of a system 100 that might be used to protect an industrial asset such as a gas turbine. The system 100 may include a plurality of monitoring nodes 110, each monitoring node generating a series of current monitoring node values over time that represent current operation of the industrial asset (e.g., a temperature, a speed, a voltage, etc.). An abnormality detection computer 160 coupled to the monitoring nodes 110 may be adapted to determine that a particular monitoring node is currently being attacked by a cyber-threat or is experiencing a failure (e.g., a sensor might be stuck). A dynamic, resilient estimator 150 may receive an indication of the abnormal monitoring node and, as a result, estimate a series of virtual node values for the attacked monitoring node based on information received from monitoring nodes that are not currently being attacked (e.g., using a lookup table 155 or a dynamic, resilient estimator). In some embodiments, an estimation of series of virtual node values happens in real-time during normal operation as opposed to estimating the virtual node values after the abnormal monitoring node information is received. Soon after the abnormal monitoring node information is received, signals from abnormal monitoring nodes may be replaced by the most current virtual node values. The virtual sensor may then replace the series of monitoring node values from the attacked monitoring node with the virtual node values (e.g., as illustrated by the dashed arrow output 152 in FIG. 1).

Figure 2:
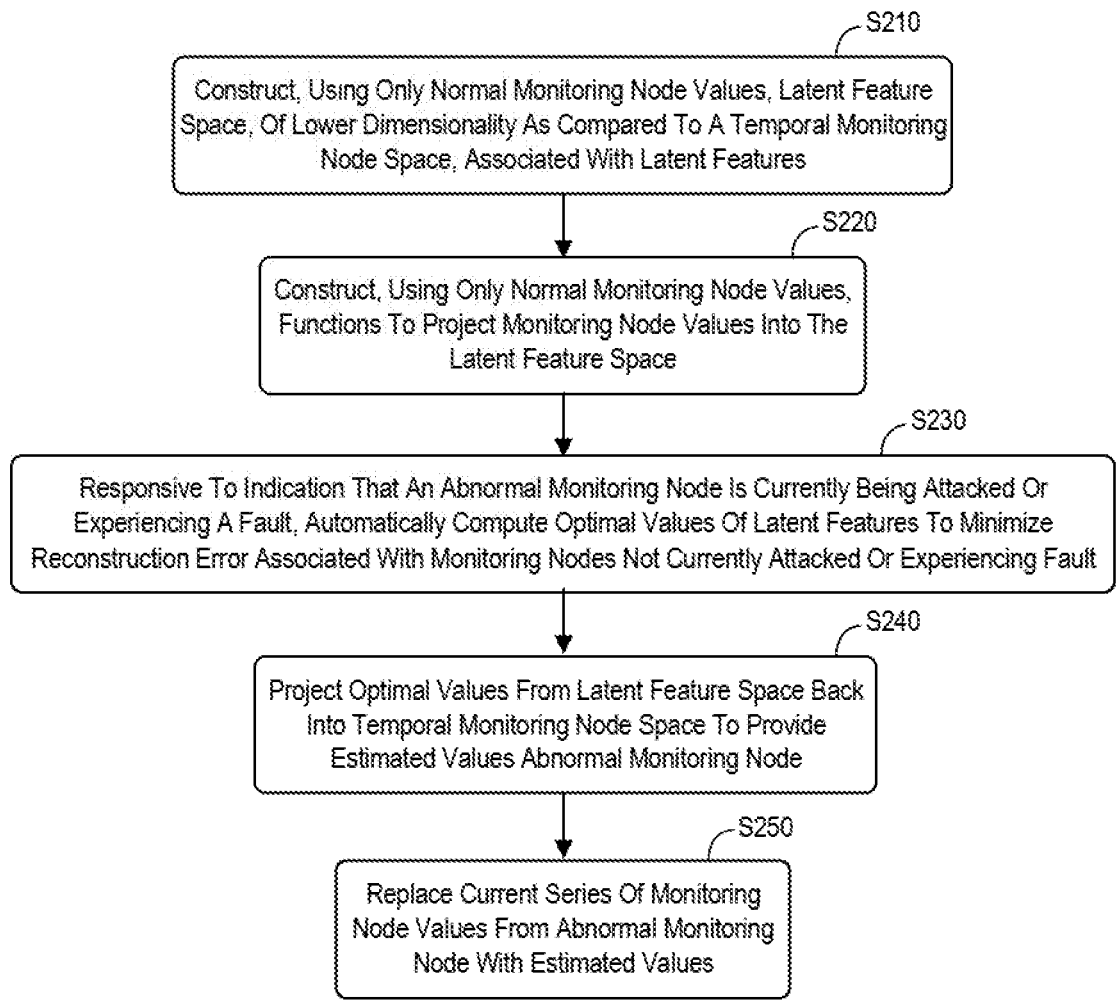
FIG. 2 is an industrial asset protection method in accordance with some embodiments.

FIG. 2 is an industrial asset protection method that might be associated with the elements of the system of FIG. 1. Note that the flowcharts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a dynamic, resilient estimator may construct, using only normal monitoring node values over time that represent a normal operation of the industrial asset, a latent feature space, of lower dimensionality as compared to a temporal monitoring node space, associated with latent features. At S220, the dynamic, resilient estimator may construct, using only normal monitoring node values over time that represent a normal operation of the industrial asset, functions to project monitoring node values into the latent feature space. Responsive to an indication that the at least one abnormal monitoring node is currently being attacked or experiencing a fault, at S230 the system may automatically compute optimal values of the latent features to minimize a reconstruction error associated with the monitoring nodes not currently being attacked or experiencing a fault. At S240, the system may project the optimal values from the latent feature space back into the temporal monitoring node space to provide estimated values of the at least one abnormal monitoring node currently being attacked or experiencing a fault. At S250, the current series of monitoring node values from the at least one abnormal monitoring node may be replaced with the estimated values.

Figure 3:
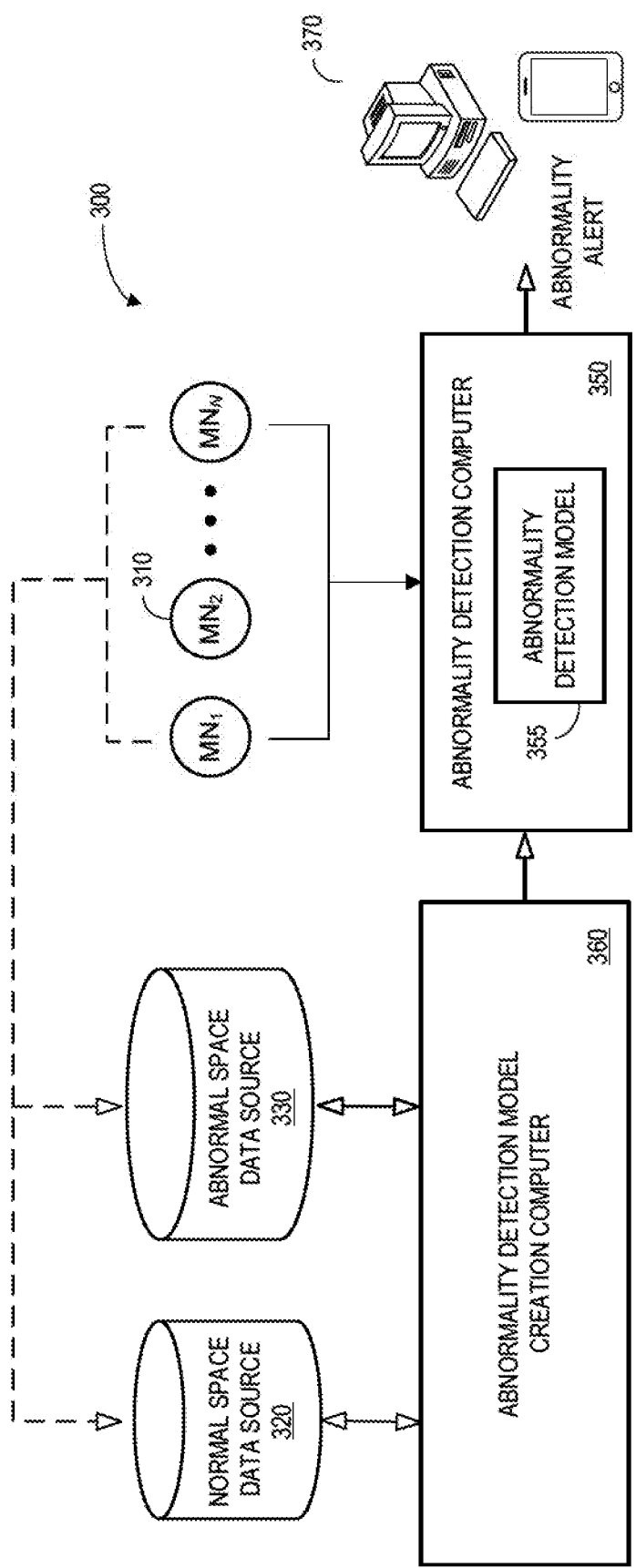
FIG. 3 is a block diagram of an industrial asset protection system according to some embodiment.

Note that a determination that a particular monitoring node is currently abnormal might be based on an abnormality detection model created for the industrial asset. For example, FIG. 3 is an example of an industrial asset protection system 300. The system 300 may include a "normal space" data source 320 storing, for each of a plurality of monitoring nodes 310, a series of normal values over time that represent normal operation of an industrial asset (e.g., collected from actual monitoring node 310 data as illustrated by the dashed line in FIG. 3). The system 300 may also include an "abnormal space" data source 330 storing series of values over time associated with monitoring nodes undergoing a cyber-attack (e.g., as recorded during an actual attack or as predicted by a high-fidelity physics-based industrial asset model) and/or experiencing a failure.

Information from the normal space data source 320 and the abnormal space data source 330 may be provided to an abnormality detection model creation computer 360 that uses this data to create a decision boundary (that is, a boundary that separates normal behavior from abnormal behavior). The decision boundary may then be used by an abnormality detection computer 350 executing an abnormality detection model 355. The abnormality detection model 355 may, for example, monitor streams of data from the monitoring nodes 310 comprising data from sensor nodes, actuator nodes, and/or any other critical monitoring nodes (e.g., monitoring nodes $MN_1$ through $MN_N$) and automatically output an abnormality alert (e.g., indicating that various monitoring nodes of the industrial asset are normal, attacked, or experiencing a fault) to one or more remote monitoring devices 370 when appropriate (e.g., for display to a user) and/or to a dynamic, resilient estimator. As used herein, the terms "automatically" or "autonomous" may refer to, for example, actions that can be performed with little or no human intervention. According to some embodiments, information about a detected abnormality may also be transmitted back to an industrial control system.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The abnormality detection model creation computer 360 may store information into and/or retrieve information from various data stores, such as the normal space data source 320 and the abnormal space data source 330. The various data sources may be locally stored or reside remote from the abnormality detection model creation computer 360. Although an abnormality threat detection model creation computer 360 is shown in FIG. 3, any number of such devices may be included. Moreover, various devices described herein might be combined according to embodiments of the present invention. For example, in some embodiments, the abnormality detection model creation computer 360, normal space data source 320, and abnormal space data source 330 might comprise a single apparatus. The abnormality detection model creation computer 360 and/or abnormality detection computer 350 functions may be performed by a constellation of networked apparatuses, in a distributed processing or cloud-based architecture.

A user may access the system 300 via one of the monitoring devices 370 (e.g., a Personal Computer ("PC"), tablet, or smartphone) to view information about and/or manage attack and fault information in accordance with any of the embodiments described herein. In some cases, an interactive graphical display interface may let a user define and/or adjust certain parameters (e.g., attack detection trigger levels or model configurations) and/or provide or receive automatically generated recommendations or results from the abnormality detection model creation computer 360 and/or the abnormality detection computer 350.

Figure 4:
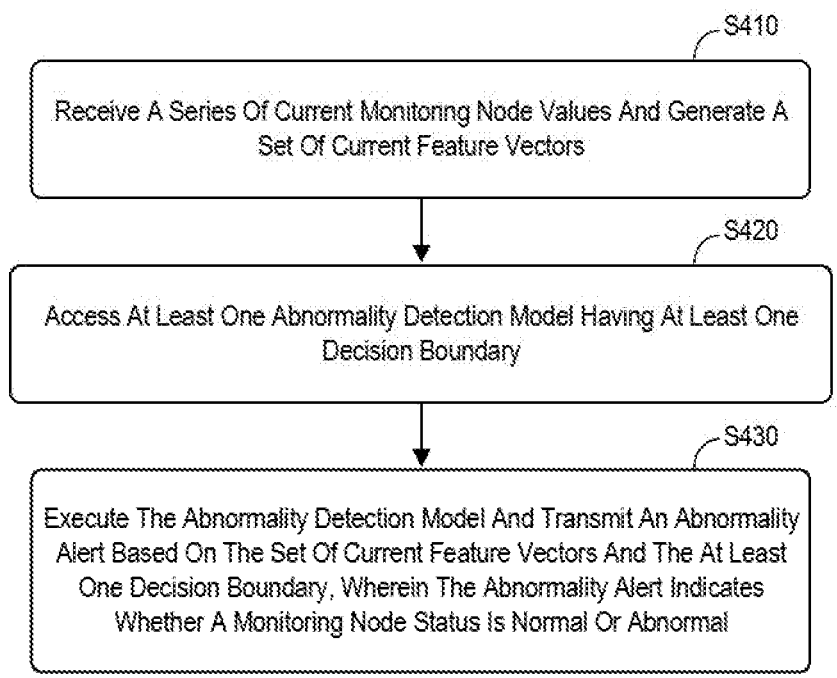
FIG. 4 illustrates a method of generating an abnormality alert in accordance with some embodiments.

The decision boundary associated with the abnormality detection model 355 can be used to detect cyber-attacks. For example, FIG. 4 is an industrial asset protection method that might be implemented according to some embodiments. At S410, the system may receive, from a plurality of monitoring nodes, a series of current values over time that represent a current operation of an industrial asset. The system may also generate, based on the received series of current values, a set of current feature vectors. At S420, an abnormality detection model may be accessed including at least one decision boundary. At S430, the model may be executed, and an abnormality alert may be transmitted (e.g., to a dynamic, resilient estimator) based on the set of current feature vectors and the decision boundary when appropriate (e.g., when a cyber-attack or fault is detected). According to some embodiments, one or more response actions may be performed when an abnormality alert is transmitted. For example, the system might automatically shut down all or a portion of the industrial asset (e.g., to let the detected potential cyber-attack or fault be further investigated). As other examples, one or more parameters might be automatically modified, a software application might be automatically triggered to capture data and/or isolate possible causes, a virtual sensor might be created or deployed, etc.

When available, a system may take advantage of the physics of an industrial asset by learning a priori from tuned high fidelity equipment models and/or actual "on the job" data to detect single or multiple simultaneous adversarial threats to or faults in the system. Moreover, monitoring node data may be converted to features using advanced feature-based methods, and the real-time operation of the control system may be monitoring in substantially real-time. Abnormalities may be detected by classifying the monitored data as being "normal" or "abnormal" (e.g., "attacked"). This decision boundary may be constructed in feature space using dynamic models and may help enable early detection of vulnerabilities (and potentially avert catastrophic failures) allowing an operator to restore the control system to normal operation in a timely fashion. Note, however, that in many cases a physics-based model of an industrial asset might not be readily available.

Figure 5:
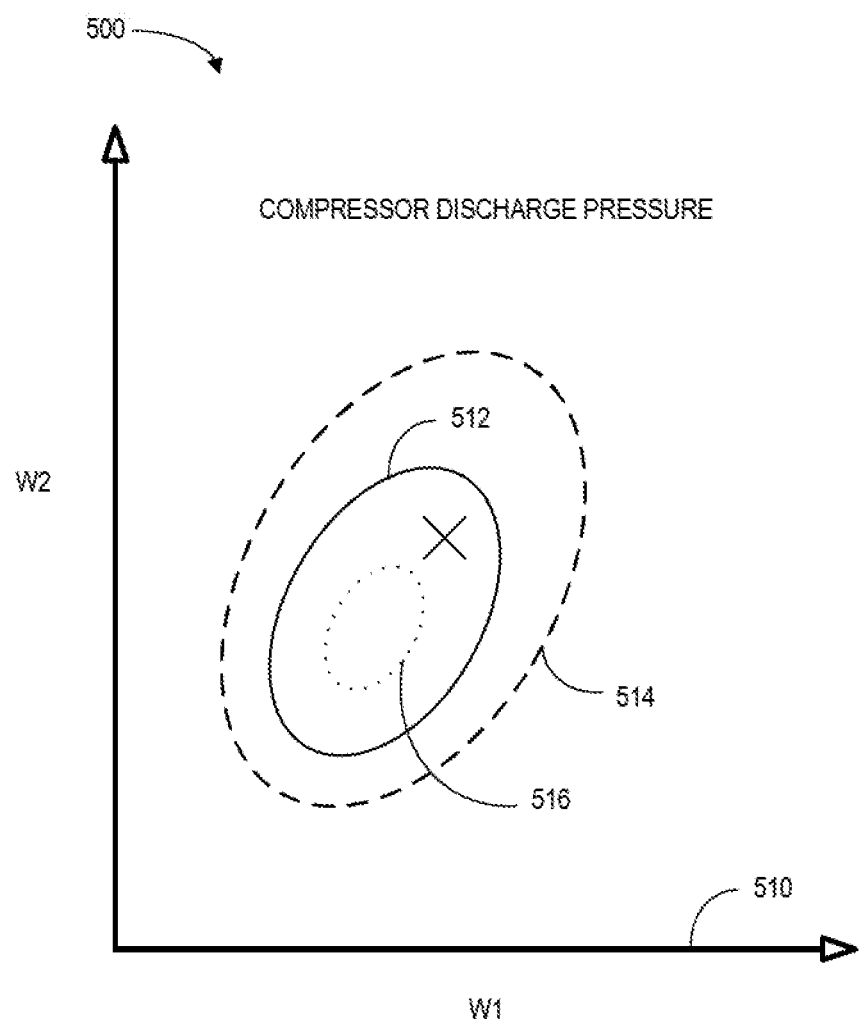
FIGS. 5 and 6 illustrate features, feature vectors, and decision boundaries in accordance with some embodiments.
Figure 6:
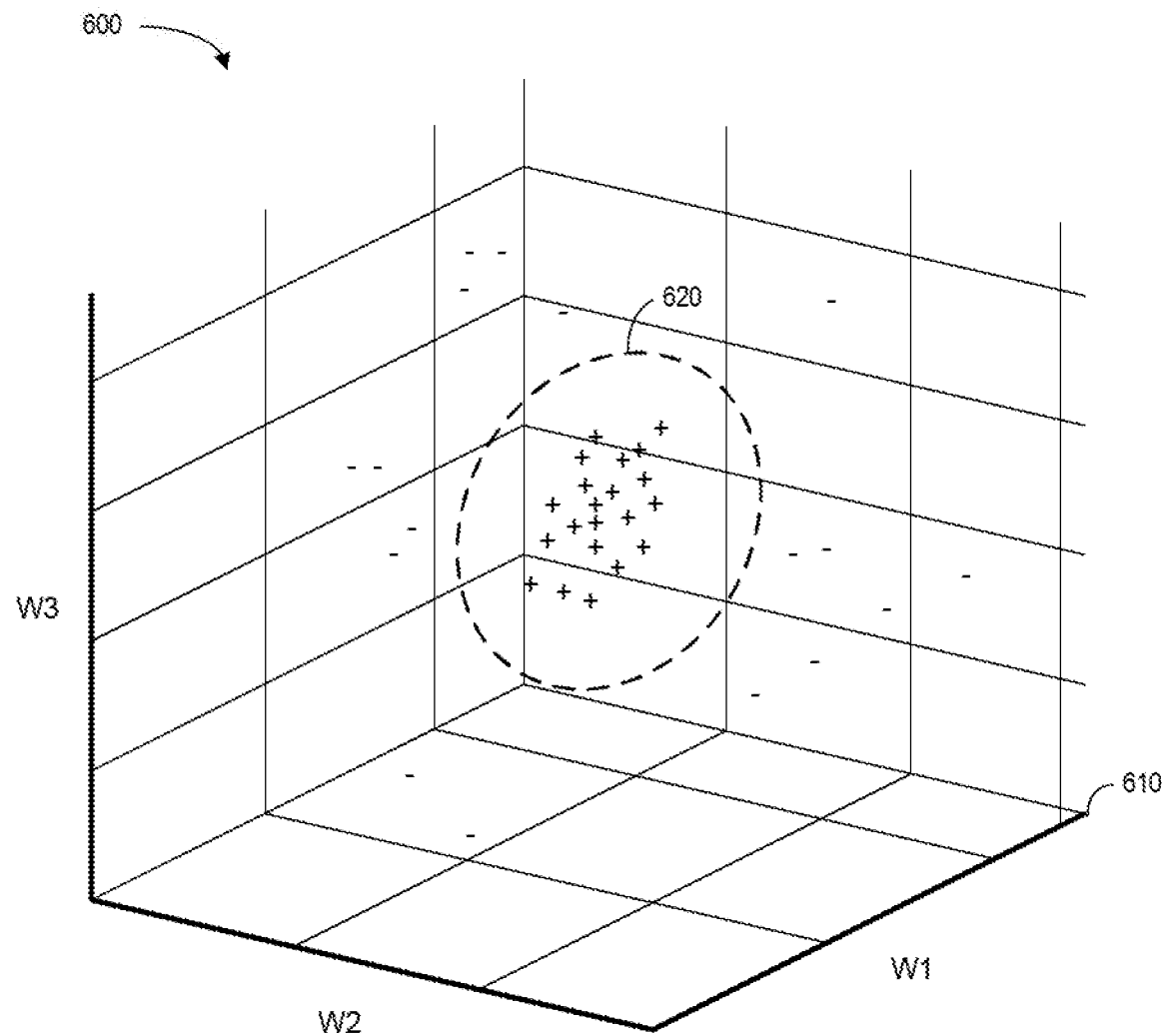

FIGS. 5 and 6 illustrate features, feature vectors, and decision boundaries in accordance with some embodiments. In particular, FIG. 5 illustrates 500 boundaries and feature vectors for a monitoring node parameter in accordance with some embodiments. A graph 510 includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") performed on input data. PCA might be one of the features that might be used by the algorithm to characterize the data, but note that other features could be leveraged. The graph 510 illustrated in FIG. 5 represents compressor discharge temperature for a gas turbine but other values might be monitored instead (e.g., compressor pressure ratio, compressor inlet temperature, fuel flow, generator power, gas turbine exhaust temperature, etc.). The graph 510 includes an average boundary 512 (solid line), a minimum boundary 514 (dotted line), a maximum boundary 516 (dashed line), and an indication associated with current feature location for the monitoring node parameter (illustrated with an "X" on the graph 510). As illustrated in FIG. 5, the current monitoring node location is between the minimum and maximum boundaries (that is, the "X" is between the dotted and dashed lines). As a result, the system may determine that the operation of the industrial asset is normal (and no attack or fault is being detected for that monitoring node). FIG. 6 illustrates 600 three dimensions of threat node outputs in accordance with some embodiments. In particular, a graph 610 plots monitoring node outputs during normal operation ("+") and when under attack or experiencing a fault ("−") in three dimensions, such as dimensions associated with PCA: w1, w2, and w3. Moreover, the graph 610 includes a dashed line indication of a normal operating space decision boundary 620.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with Design of Experiments ("DoE") techniques. Moreover, multiple algorithmic methods (e.g., support vector machines or other machine learning based supervised learning techniques) may be used to generate decision boundaries. Since boundaries may be driven by measured data, defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account an operator's knowledge about system operation (e.g., the differences between normal and abnormal operation).

Figure 7:
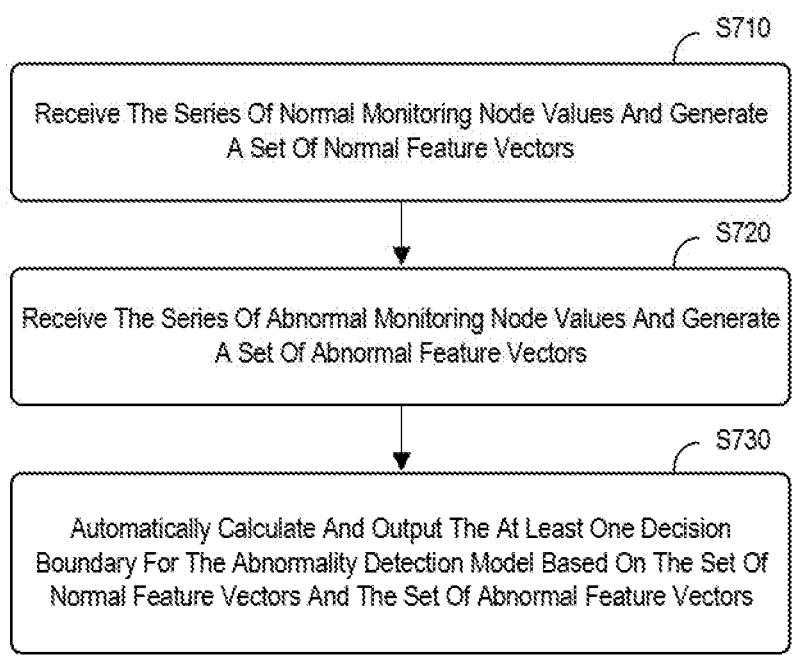
FIG. 7 is an abnormality detection model creation method according to some embodiments.

FIG. 7 illustrates a model creation method that might be performed by some or all of the elements of the system 100, 300 described with respect to FIGS. 1 and 3. At S710, the system may receive, for each of a plurality of monitoring nodes, a series of normal values over time that represent normal operation of the industrial asset and a set of normal feature vectors may be generated. At S720, the system may retrieve, for each of the plurality of monitoring nodes, a series of abnormal values over time that represent abnormal operation of the industrial asset and a set of abnormal feature vectors may be generated. The series of normal values might be obtained, for example, by DoE on an industrial control system associated with a power turbine, a jet engine, a locomotive, an autonomous vehicle, etc. At S730, a decision boundary may be automatically calculated and output for an abnormality detection model based on the sets of normal and abnormal feature vectors. According to some embodiments, the decision boundary might be associated with a line, a hyperplane, a non-linear boundary separating normal space from attacked space, and/or a plurality of decision boundaries. In addition, note that the abnormality detection model might be associated with the decision boundary, feature mapping functions, and/or feature parameters.

Thus, a system may classify the status of an industrial control system having a plurality of monitoring nodes (including sensor, actuator, and controller nodes) as being normal or abnormal. This may enable tailored, resilient, and fault-tolerant control remedies, including the deployment of virtual sensors, against cyber-attacks and faults.

According to some embodiments, time-series data may be received from a collection of monitoring nodes (e.g., sensor, actuator, and/or controller nodes). Features may then be extracted from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node, might be optimized using domain-knowledge, feature engineering, or ROC statistics. The local features for each monitoring node may be stacked to create the global feature vector. The global feature vector may also contain interactive feature involving two or more monitoring nodes, e.g. cross-correlation between two nodes. According to some embodiments, the features may be normalized and the dimension of the global feature vector can then be further reduced using any dimensionality reduction technique such as PCA. Note that the features may be calculated over a sliding window of the signal time series and the length of the window (and the duration of the slide) may be determined from domain knowledge and inspection of the data or using batch processing.

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Note that PCA information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a monitoring node quantity at "k" instant of time. Moreover, the output may then be expressed as a weighted linear combination of basis functions as follows:

$$S = S_0 + \sum_{j=1}^{N} w_j \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, the weight may be found using the following equation (assuming that the basis sets are orthogonal):

$$w_j = (S - S_0)^T \Psi_j$$

Note that weights may be an example of features used in a feature vector.

Thus, once the observed quantities from monitoring nodes are expressed in terms of feature vectors (e.g., with many features), the feature vectors may then be used as points in a multi-dimensional feature space. During real-time abnormality detection, decisions may be made by comparing where each point falls with respect to a decision boundary that separates the space between two regions (or spaces): abnormal ("attack" or "fault") space and normal operating space. If the point falls in the abnormal space, the industrial asset is undergoing an abnormal operation such as during a cyber-attack. If the point falls in the normal operating space, the industrial asset is not undergoing an abnormal operation such as during a cyber-attack or fault. In some embodiments, an appropriate decision zone with boundaries is constructed using data sets as described herein with high fidelity models. For example, support vector machines may be used with a kernel function to construct a decision boundary. According to some embodiments, deep learning techniques may be used to construct decision boundaries.

Note that industrial processes may be controlled by Programmable Logic Controllers ("PLC") with Ethernet ports and IP addresses. Computer worms can live in the PLC and be inactive for many days and can replicate itself into many targets as it finds them. IT and OT protection mechanisms cannot completely keep a PLC safe and different approaches may be needed to protect critical infrastructures from more advanced viruses and allow for an industrial asset to operate (including critical functions) even when being attacked. In particular some embodiments described herein provide a multi-node virtual sensor to sustain operation of an industrial asset with no loss of critical function. The virtual sensor might utilize, for example, some or all of the following information to estimate true signals; (1) information from localization about which nodes were attacked independently, (2) features from monitoring nodes, and (3) a multi-node feature-based virtual sensor model trained a priori from the system data set. Estimated true signals may then be used in the respective nodes instead of attacked signals.

In a control system during operational normalcy, the system may receive time series signals from various monitoring nodes (i.e., sensor, actuator, controller, etc.). Consider a general system (e.g., cyber physical system, software system, bio-mechanical system, network system, communication system, etc.) that contains access to continuous streams of data in the form of time series signals from all these sensors. The time series signals might be generated from a set of output sensor nodes ("y"; both physical and virtual sensors already incorporated in the system), a set of actuator nodes ("u"; both hard and soft actuators generated from open or closed loop system), a set of output of controller nodes ("c"; controller node signals), and a set of reference nodes ("r"; reference signals). According to some embodiments, logicals are also considered as time series signals. Some or all combinations of these signals may be used for the purpose of accommodation with a virtual sensor. The virtual sensor matrix used for this purpose may, for example, estimate not only system sensor outputs, y, when an attack takes place to any of the sensor nodes, but also other signals to the control system; actuator node signals, u, controller node signals, c, reference signals, r, etc. Thus, the virtual sensor-based accommodation system may provide an intelligent system that is designed to estimate signals that are corrupted/attacked from the healthy signals it receives.

Some embodiments described herein may provide a system and method for autonomous reconfigurable virtual sensing to neutralize the effect of anomalies (cyber-attack or faults) in system measurements. The system may provide correct estimates of compromised sensor measurements using uncompromised sensor measurements, thus replacing the comprised sensors with healthy virtual (or "soft") sensors. The dynamic, resilient estimator may use, according to some embodiments, continuous dynamic learning. For example, virtual sensor estimations may be computed on-line (during operation of the industrial asset) using a dynamic recursive method based on reinforcement learning. The system may be scalable, efficient, and automatically adjust its configuration to accommodate the time-varying uncompromised portion of the system sensors. Note that the system might work with partial, or no, a priori knowledge (e.g., a predetermined virtual sensor model).

Some embodiments described herein may provide a resilient estimation method for sensors of a control system to maintain the integrity and availability of the system under abnormalities such as cyber-attacks and sensor faults/failures. According to some embodiments, a virtual sensing system may satisfy some or all of the following four criteria:

1. the virtual estimator is unbiased (i.e., zero-mean error);
2. the virtual estimator has white innovation (optimal in the sense of a Cramer-Rao information bound);
3. the virtual estimator is statistically efficient (i.e., the error asymptotically converging to zero); and
4. the estimation error standard division is comparable to the real sensor measurement (so the quality of the virtual estimations is comparable with the physical sensor measurement).

Note that a system may receive time-series data from a collection of sensor monitoring nodes and replace independently attacked/faulty sensor(s) with their virtual estimate(s) as soon as an abnormality is detected. For each compromised sensor, the system may construct a dynamic, resilient estimator using uncompromised sensors. Each of such dynamic, resilient estimators can use all (or a subset) of the remaining healthy sensors. For example, for each sensor, an Analysis Of Variance ("ANOVA") or correlation/regression analysis may be performed to rank the contributing factors. The system may then down-select the significant sensors, which are desirable for virtual modeling of each particular on-line sensor estimator. Then, using the aforementioned ANOVA or correlation analysis, the list of the factors to be used in each virtual model may pre-stored into the system, while the virtual sensing model is learnt and adapted online.

Figure 8:
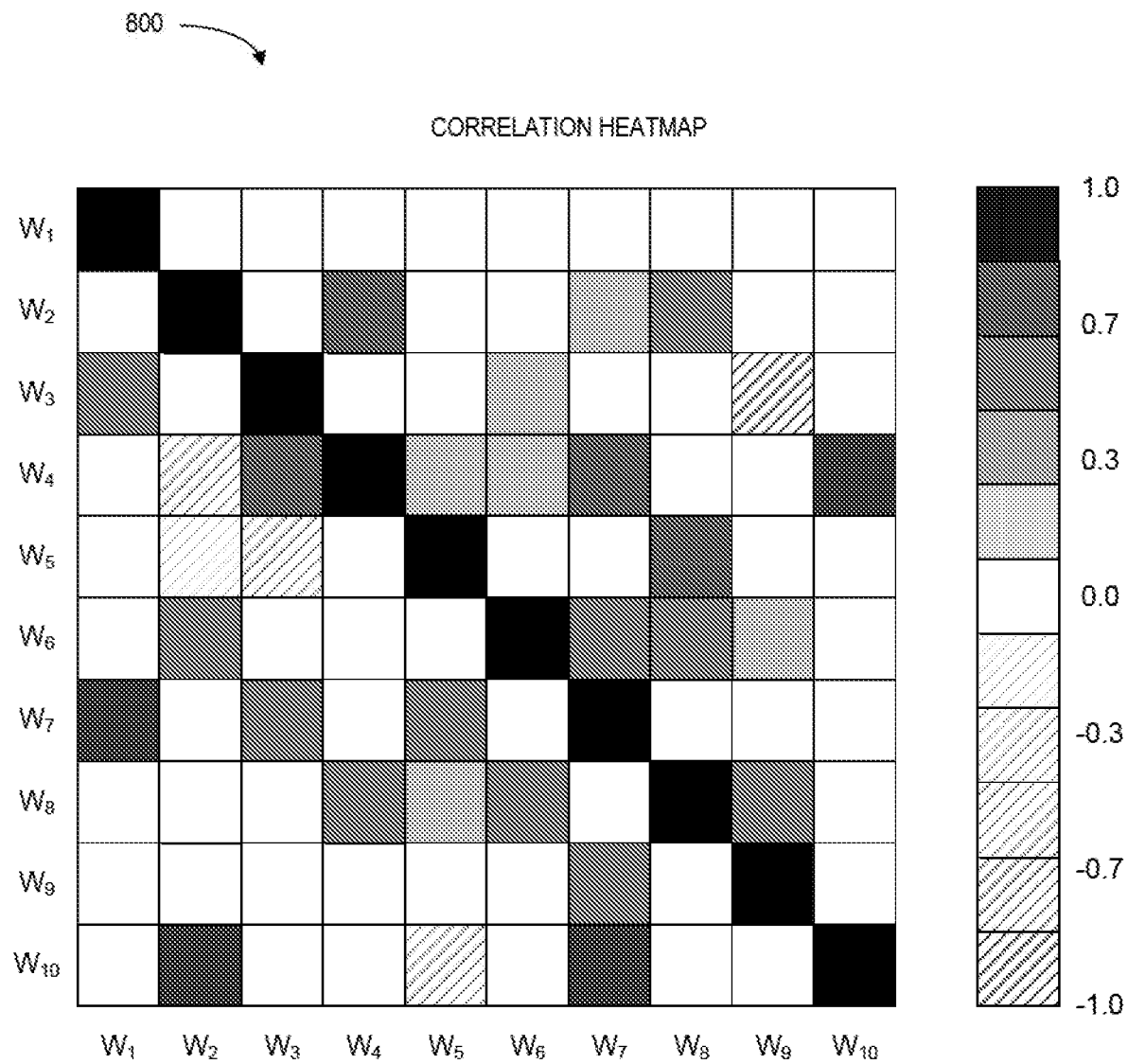
FIG. 8 is a correlation heat map of monitoring nodes in accordance with some embodiments.

For example, FIG. 8 shows a correlation heat map 800 for ten monitoring nodes (sensors/actuators/controller nodes) of a gas turbine. Pairs of values may each have a correlation scores (e.g., from 1 indicating a strong correlation to zero indicating no correlation to −1 indicating a strong negative correlation). For each node, the other nodes whose absolute value of the correlation coefficient is larger than a threshold (e.g., above 0.25) might be stored as main contributing factors. For the critical sensors of the system, or the ones that measure highly nonlinear dynamic phenomena, an off-line model could be learned and then adapted online. For the rest of the sensors, the on-line learning may start completely model-free and the models may be learned from scratch, in real-time during operation of the industrial asset. Note that a virtual sensor may also utilize a lookup table, such as the table 900 illustrated in FIG. 9 including a virtual sensor matrix 910 and a signal being estimated 920, to create a value $Y_i = C_{i,j} X_i$ (where i represents the signals in feature space being estimated and j represents the number of attacked signals being estimated).

Some embodiments described herein may assume that when the attacked/faulty sensors are removed, the compromised plant remains observable. The continuous learning may be based on Reinforcement Learning ("RL") methodology. For example, an online learning algorithm such as Q-learning or the recursive least-squares method might be used for reinforcement learning. According to some embodiments, the approach might be interpreted as a Partially Observed Markov Decision Process ("POMDP") with continuous state and action spaces. This POMDP may exhibit, for example, deterministic transitions when configuration transitions are specified by a sensor diagnostics and anomaly classification module. A reinforcement learning engine can work on a deep neural network using Q-learning thus comprising a deep Q-network.

During normal operation, all sensors go into a reinforcement learning method running an online learning algorithm (e.g., a recursive least-square, a recursive weighted least square, Q-learning, etc.). This may comprise a "base" configuration of the system. The base configuration remains in place as long as there are no reported abnormalities (i.e., attacks or faults). Once an abnormality is reported, the virtual sensing system automatically adopts into a "partial" configuration for which the healthy sensors are the inputs and the estimates of both the compromised sensors as well normal sensors are the outputs. According to some embodiments, the system may keep the healthy sensors in the estimation loop (i.e., forming a full-order observer) so that at each instant a learnt model for virtual estimations of all sensors is readily available. In this way, if another sensor is suddenly compromised, the system will keep running without facing discontinuity in the underlying optimization procedures of continuous learning. Inside the partial configuration, all or a subset of inputs may be used to compute each particular output. The virtual sensor estimator may be a full-order observer both during the base and partial configurations, hence providing estimates of the measurements of the sensors at all times. The correlation analysis previously described may be used to provide initial guess for the reward/penalty weighting functions in the reinforcement learning.

The continuous learning described herein may serve as a core of a model-free (or partial-model) Kalman filter, which receives partial or full measurements (depending of the status of the system) and provide full-order (or reduced-order) output estimates. A Kalman Temporal Differences technique may be used to implement the Kalman Filter. The described reinforcement learning based continuous learning framework may satisfies the conditions 1 through 4 previously mentioned as long as the plant remains observable through usage of the uncompromised subset of sensors. If the plant loses this observability due to large number of sensors being compromised, the system may still provide virtual sensor estimates but some or all of the conditions may no longer be satisfied. According to some embodiments, an online observability test may be performed using the models built online and a warning may be generated by the dynamic, resilient estimator in this situation. In addition, statistical tests (such as $X^2$ test) may be performed online using the innovation signal of the uncompromised sensor measurements, which are readily available verses their virtual estimates, which are part of the virtual estimator outputs.

Figure 10:
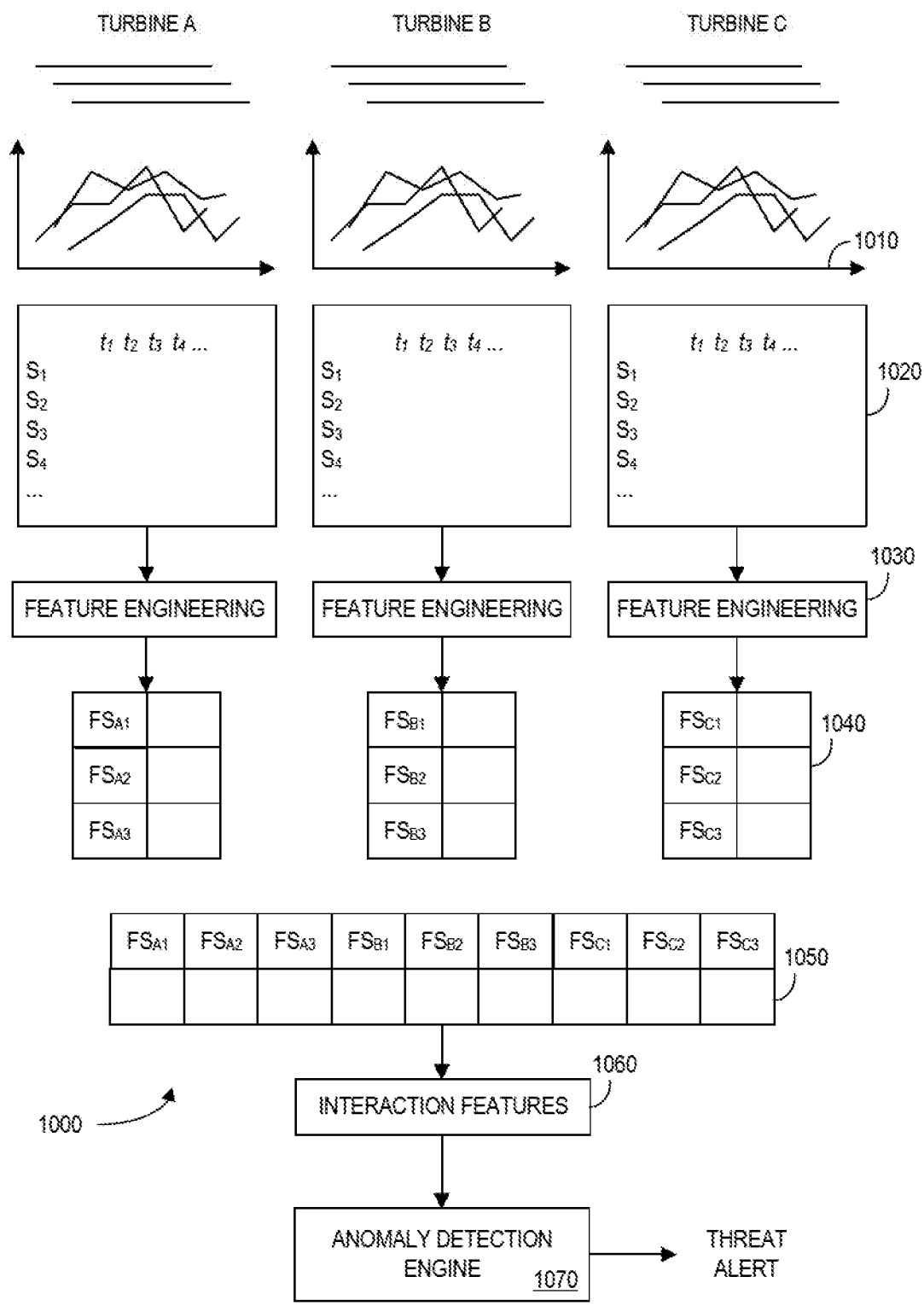
FIG. 10 is an example of a global threat protection system in accordance with some embodiments when multiple gas turbines are involved in a system.

Note that feature vectors might represent local or global information. For example, FIG. 10 is an example of a global threat protection system 1000 in accordance with some embodiments when multiple gas turbines are involved in a system. In particular, the system 1000 includes three turbines (A, B, and C) and batches of values 1010 from threat nodes are collected for each generated over a period of time (e.g., 60 to 80 seconds). According to some embodiments, the batches of values 1010 from threat nodes overlap in time. The values 1010 from threat nodes may, for example, be stored in a matrix 1020 arranged by time ($t_1$, $t_2$, etc.) and by type of threat node ($S_1$, $S_5$, etc.). Feature engineering components 1030 may use information in each matrix 1020 to create a feature vector 1040 for each of the three turbines (e.g., the feature vector 1040 for turbine C might include $FS_{C1}$, $FS_{C2}$, etc.). The three feature vectors 1040 may then be combined into a single global feature vector 1050 for the system 1000. Interaction features 1060 may be applied (e.g., associated with A*B*C, A+B+C, etc.) and an anomaly detection engine 1070 may compare the result with a decision boundary and output a threat alert signal when appropriate.

Figure 11:
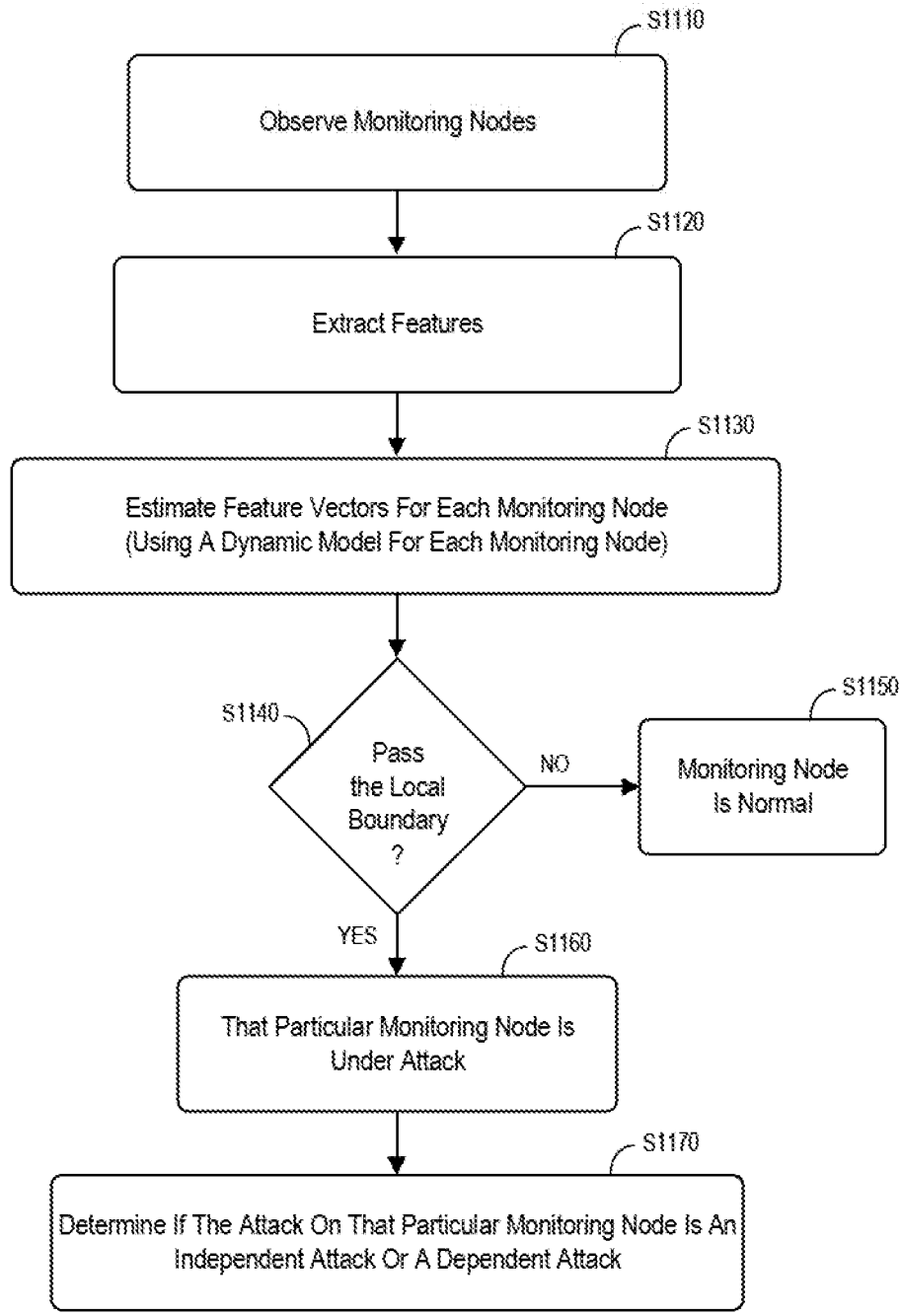
FIG. 11 is a method that might be associated with an on-line operational process in accordance with some embodiments.

FIG. 11 is a method that might be associated with an on-line operational process in accordance with some embodiments. After observing the monitoring nodes at S1110, the features are extracted at S1120 from each observation of each monitoring node. Then using the dynamic models identified in a training phase, each model then generates filtered or estimated features at S1130 using stochastic estimation techniques, such as Kalman filtering. In some embodiments, dynamic models may not be required to further filter or estimate features. The covariance matrix of the process noise needed for the stochastic estimator is readily available here as Q, which can be computed during training phase as the covariance of the error term e(t). Then the output of each stochastic estimator is compared against its corresponding local decision boundary at S1140, also computed and pre-stored during the training phase. If the local boundary is not passed at S1140, the monitoring node is normal at S1150. Each monitoring node with an estimated feature that violates the corresponding decision boundary is reported as being under attack at 51160.

In the next stage, the system post-processes the localized attack and determines whether the detected attack is an independent attack or it is an artifact of the previous attack through propagation of the effects in the closed-loop feedback control system at 51170. This may provide additional information and insight and may be useful when multiple attacks are detected at the same time.

Figure 12:
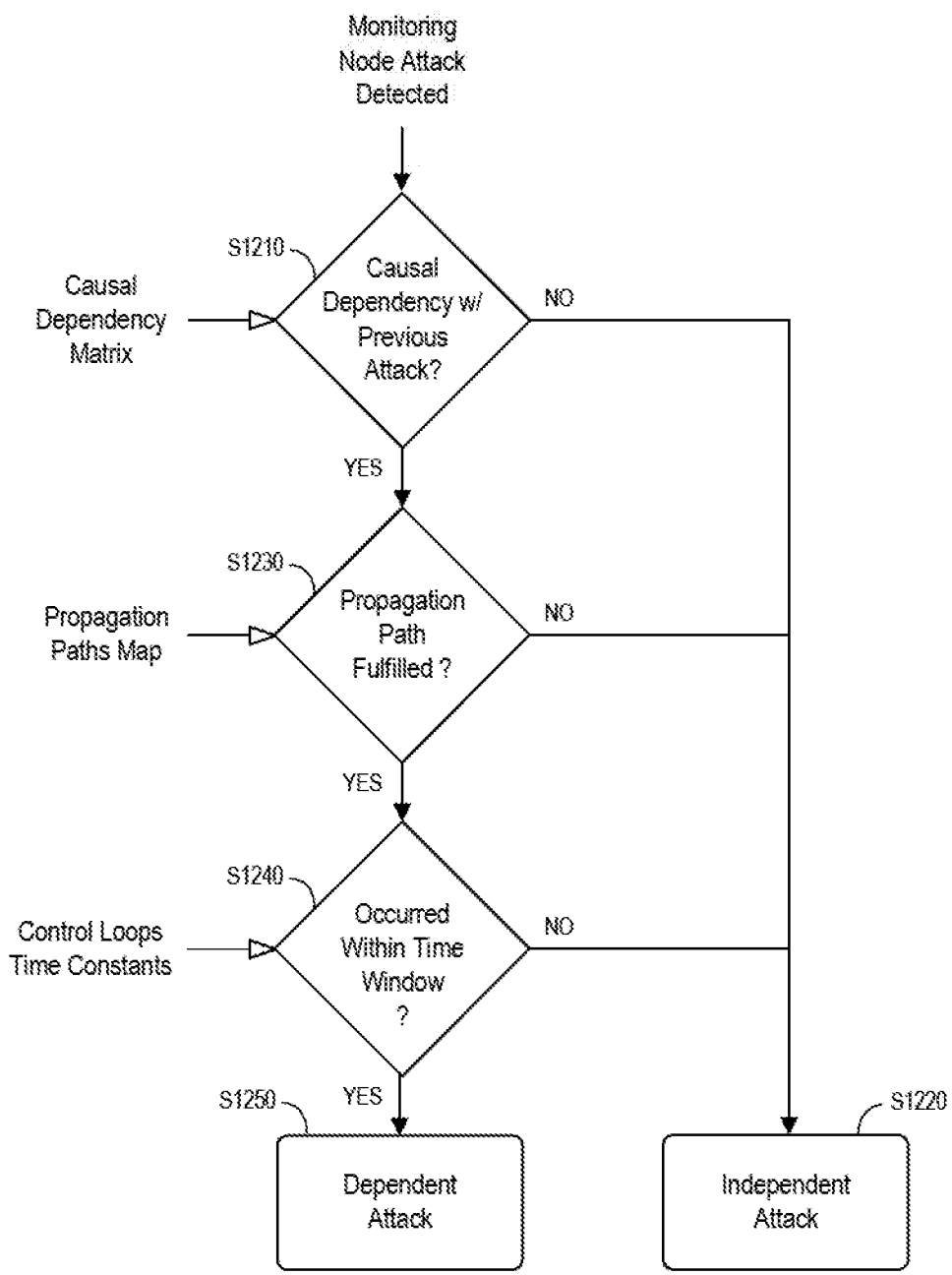
FIG. 12 is a method of determining whether an attack is an independent attack or a dependent attack according to some embodiments.

For example, FIG. 12 is a method of determining whether an attack is an independent attack or a dependent attack according to some embodiments. According to some embodiments, three tests may be performed to determine if an attack should be classified as an "independent attack" or a "dependent attack:" (1) a causal dependency test, (2) a propagation path test, and (3) a time separation test. Together, these three tests are referred to herein as the "attack dependency conformance test." At S1210, a causal dependency matrix may be used to determine if the current attack was potentially caused by a previous attack. If the current attack could not have been caused by a previous attack at S1210, it is classified as an "independent attack" at S1220. In this causality test, the system may check whether there is a potential causal dependency between the newly detected attack and any previously detected attack on other monitoring nodes. This check might be based on, for example, a binary matrix of causal dependencies between any two nodes (e.g., as described with respect to FIG. 16). The causal dependency matrix might be generated, according to some embodiments, based on domain knowledge. If no such possible dependencies exist, the attack is reported as an "independent attack" at S1220. Otherwise, the system may perform a second check.

In particular, at S1230 a propagation paths map may be used to determine if the current attack potentially propagated from a previous attack. If the current attack could not have propagated from a previous attack at S1230, it is classified as an "independent attack" at S1220. In this propagation test, for each causal dependency the system may check whether a propagation path is fulfilled. This might mean that, for example, if the effect of node 1 being under attack is propagated to node 4, through node 3, then an anomaly in node 1 can cause an anomaly on node 4 only if node 3 is already anomalous. The anomaly propagation paths might also be defined by domain knowledge and pre-stored in the localization system. If no such propagation paths are fulfilled, then the attack is reported an "independent attack" at S1220. Otherwise, the system may perform the third check.

At S1240, control loops time constraints may be used to determine if the current attack was potentially caused by a previous attack based on time separation. If the current attack could not have been caused by a previous attack based on time separation at S1240, it is classified as an "independent attack" at S1220. This time separation test may utilize the fact that if the attacked monitoring under investigation is an artifact of the closed-loop feedback system, then the effect should arise within a time window between the rise time and the settling time of the control loop corresponding to the monitoring node. However, since the system uses a dynamic estimator, a propagation time may need to be added throughout the estimator. Using n features, and p lags in the models, the dynamic estimator will have n*p states, and therefore adds n*p sampling times delay into the system. Therefore, the expected time window for a dependent attack to occur might be defined by:

$$1.5*\tau+n*p<\Delta t<5*\tau+n*p$$

where $\Delta t$ is the time after any previously detected attacks on other nodes that has passed checks 1 and 2, and $\tau$ is the time constant of the control loop responsible for the current node under investigation. If such a time-separation check is not passed, the system reports the attack as an independent attack at S1220.

If it is determined at S1250 that the current attack meets the time separation test (and, therefore, also meets both the propagation test of S1230 and the causal dependency test of S1240), the current attack is classified as a "dependent attack" at S2150.

Note that other attack and anomaly detection techniques may only provide a binary status of the overall system (whether it is under attack or not). Embodiments described herein may provide an additional layer of information by localizing the attack and determining not only if the system is under attack (or not) but also which node is exactly under attack.

As a result, embodiments may provide a significant and automated solution to attack localization. Note that the attack localization information may be important when responding to the attack, including operator action plans and resilient control under attack. Embodiments described herein may handle multiple simultaneous anomalies in the system, which is beyond the capability of the conventional fault detection systems. This may also let the approaches described herein be used as a fault detection and isolation technique for more sophisticated, multiple-fault scenarios. Further, distributed detection and localization systems enabled by embodiments described herein across multiple equipment and systems may allow for a coordination of data to detect and precisely pin-point coordinated multi-prong attacks. This may further enable a relatively quick way to perform forensics and/or analysis after an attack.

Note that some embodiments may analyze information in the feature space, which has many advantages over working in the original signal spaces, including high-level data abstraction and modeling high dimensional spaces without adding substantial computational complexity. The feature-based method for localization may also extend feature vectors and/or incorporate new features into existing vectors as new learnings or alternate sources of data become available. Embodiments described herein may also enable use of heterogeneous sensor data in a large-scale interconnected system, even when the data comes from many geospatially located heterogeneous sensors (i.e., conventional plant sensors, unconventional sensors such as cell-phone data, logical, etc.). This may offer additional commercial advantages for post-mortem analysis after an attack.

Figure 13:
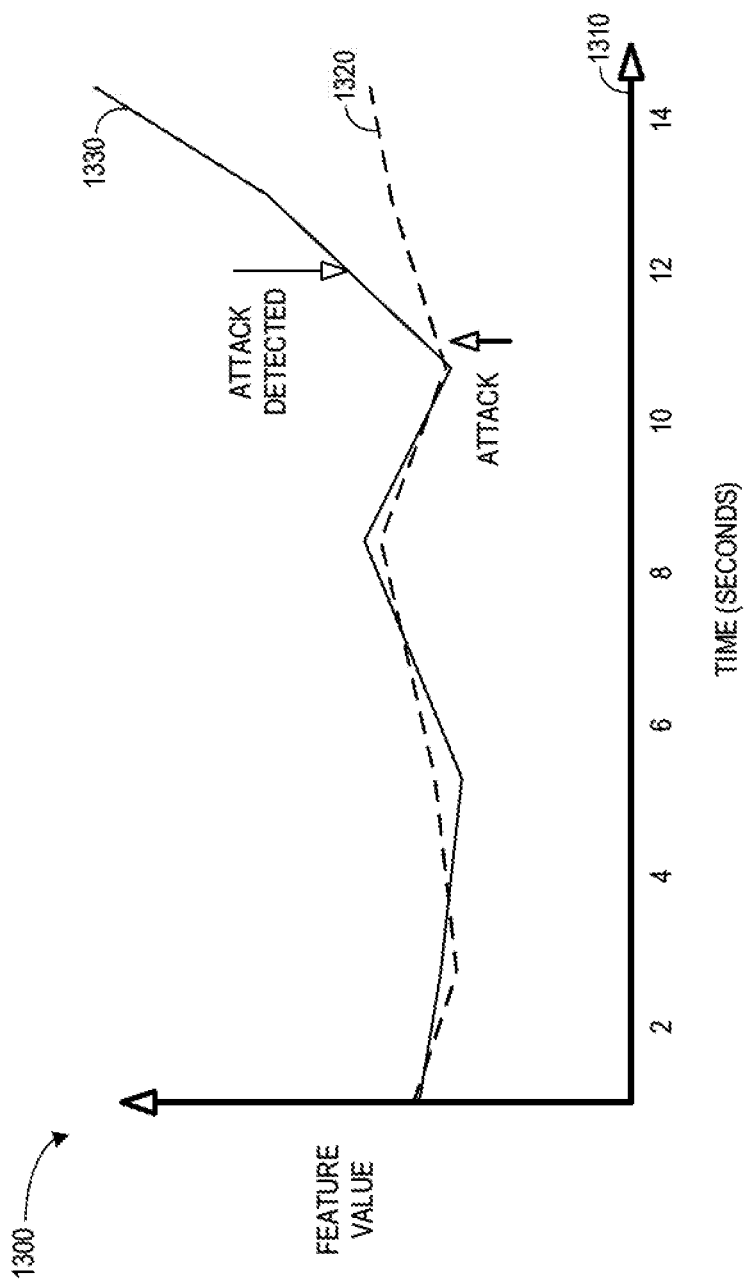
FIG. 13 illustrates a feature time series of an attack comparing the real-time feature of a monitoring node to the modeled feature of the monitoring node according to some embodiments.

FIG. 13 illustrates a feature time series 1300 of a first attack example comparing the real-time feature of a monitoring node to the modeled feature of a monitoring node via a graph 1310 according to some embodiments. In particular, the examples described with respect to FIGS. 13 through 16 involve the following parameters for a gas power turbine (similar to those values described with respect to FIGS. 4 through 6):

Compressor Discharge Pressure ("CPD"),
Compressor Discharge Temperature ("CTD"),
Compressor Inlet Temperature ("CTIM"),
Turbine Fuel Flow ("FQG"),
Generator Electrical Power Output ("DWATT"), and
Turbine Exhaust Temperature ("TTXM").

Consider, for example, an attack on TTXM. In this single attack scenario, the system may want to verify whether it can detect and localize the attacked node. As illustrated in FIG. 13, the attack is detected at t=11 sec. Using the embodiments described herein, the attack is detected within 1 sec and correctly localized to TTXM. FIG. 13 shows the measured feature time series of the detected and localized attack 1330 along with the generated features 1320 estimated using stochastic model-based estimation.

Figure 14:
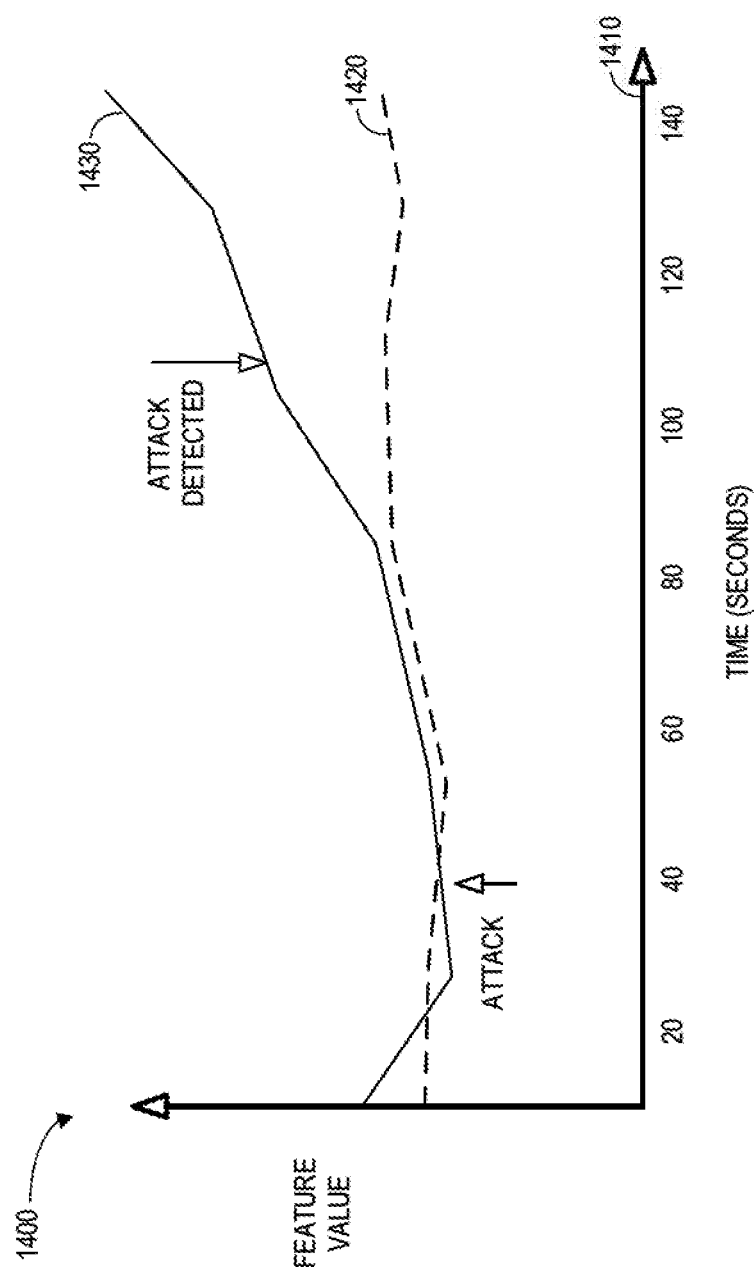
FIG. 14 illustrates a feature time series of a stealthy attack comparing the real-time feature of a monitoring node to the modeled feature of a monitoring node in accordance with some embodiments.
Figure 15:
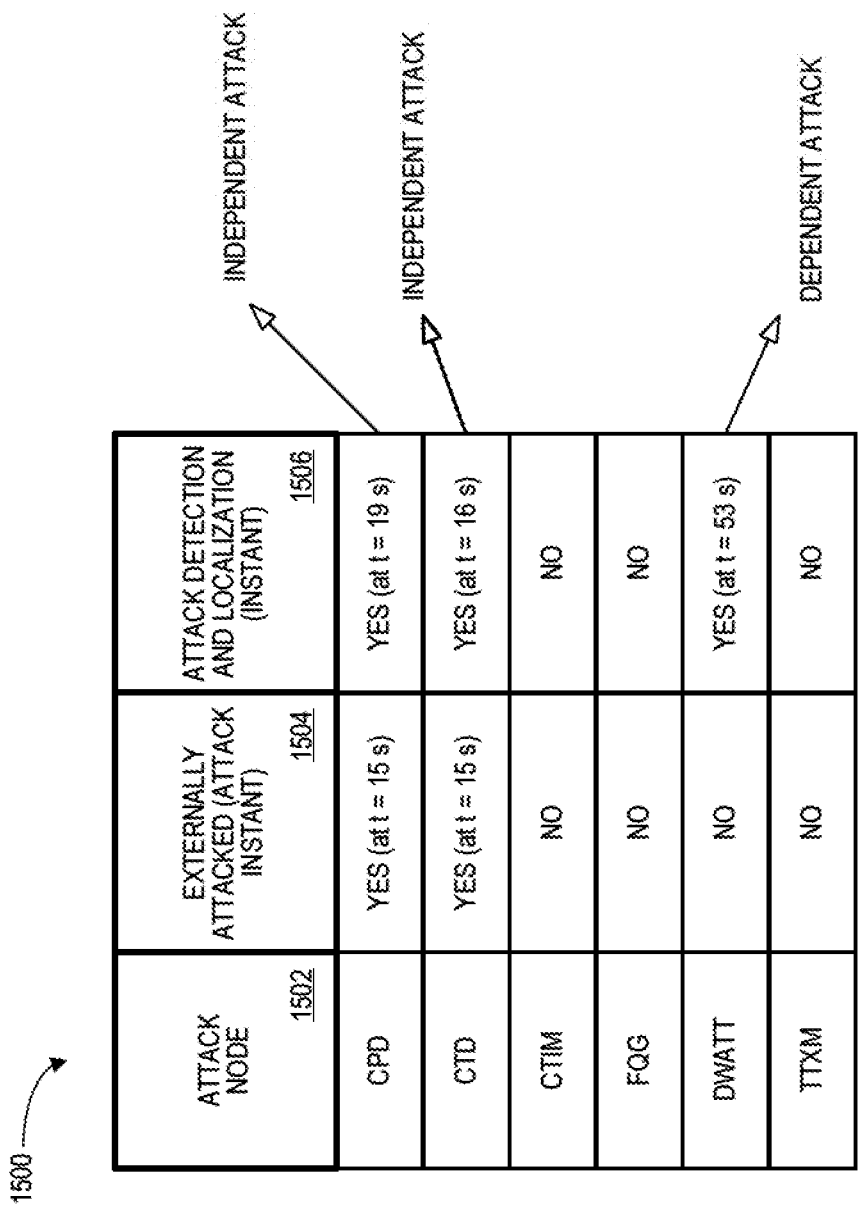
FIG. 15 is an example of attack localization in a multiple-attack scenario according to some embodiments.

FIG. 14 illustrates a feature time series 1400 via a graph 1410 of a second (stealthy) attack comparing the real-time feature of a monitoring ode to the modeled feature of a monitoring node in accordance with some embodiments. That is, this is again an attack on TTXM but this time the attack simulates a stealthy attack in which the sensor is tampered with slowly over time and/or elaborately. Such stealthy attacks are designed to pass the existing fault diagnosis system and can remain in the control system for a long time without being detected. In this simulation, the attack was applied at t=40 sec. Using the localization methods described herein, the attack was detected at t=105 sec, and is correctly localized to TTXM. FIG. 14 shows the measured feature time series of the detected and localized attack 1430 along with the expected features 1420 estimated using the stochastic model-based estimation.

In a third attack scenario, the system may simulate a simultaneous attack on two monitoring nodes. Two sensors are attacked at the same time, namely CPD and CTD, and both attacks are applied at t=15 sec. Using embodiments described herein, both attacks are truly detected and localized within seconds. Out of the other 4 sensors, 3 are correctly not detected at all. One is detected (DWATT) at a later time, which is dependent attack. The results are summarized in the table 1500 of FIG. 15. In particular, the table 1500 lists the attack nodes 1502 along with associated externally attacked data 1504 and attack detection and localization data 1506.

In this third example (illustrated in the table 1500), there are two externally injected attacks on CPD and CTD. The first attack is detected at t=16 sec and localized to CTD. Since there is no previously detected attack, the causality test fails and this attack is correctly reported as an "independent attack." The second attack is detected at t=19 sec and correctly localized to CPD. In this case, there is causal dependency and a direct proportion path from CTD to CPD. The causal dependency matrix 1600 for this example is shown in FIG. 16. The matrix 1600 lists each potential attack node and whether or not that node can have an effect on each other node (with a "1" indicating a potential effect and a "0" indicating no potential effect).

The second attack therefore passes both the causality test and the proportion test. However, based on time separation criterion, in order for the CPD attack to be a dependent attack it must have happened within 4.25<$\Delta t$<9.5 sec after the CTD detection instance. The actual $\Delta t$ illustrated in the table 1500 is 3 sec (that is, 19 sec-16 sec). Therefore, the time separation test is not passed and, as a result, the CPD attack is correctly reported as an "independent attack."

At t=53 sec, the DWATT sensor is also reported as being under attack. Note that there are two previously reported attacks, and the causality and propagation tests pass for both previous attacks (as shown in the matrix 2000). Using the time separation criterion, the DWATT attack instant must be with 15.5<Δt<47 sec after those attacks. The table 1500 lists the actual Δt as Δt=53 sec−16 sec=37 sec for CTD attack and Δt=53 sec−19 sec=34 sec for CPD attack. So, the time separation test passes for both previous attacks and, therefore, the DWATT attack is correctly reported as a "dependent attack." Note that, based some embodiments described herein, passing the time separation test even for one previously detected attack may still be enough to report DWATT as a dependent attack.

Figure 17:
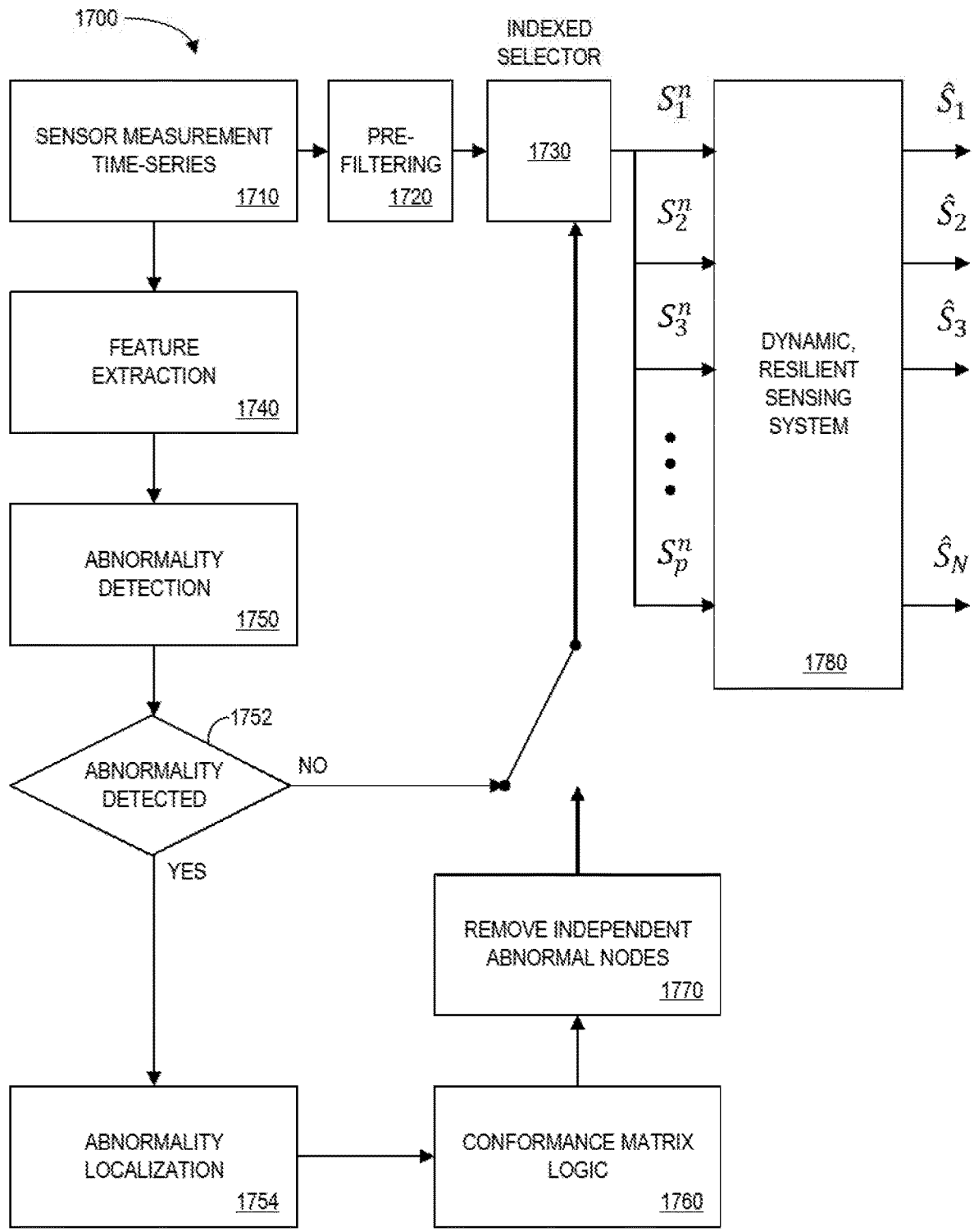
FIG. 17 is an autonomous reconfigurable virtual sensing system architecture according to some embodiments.
Figure 18:
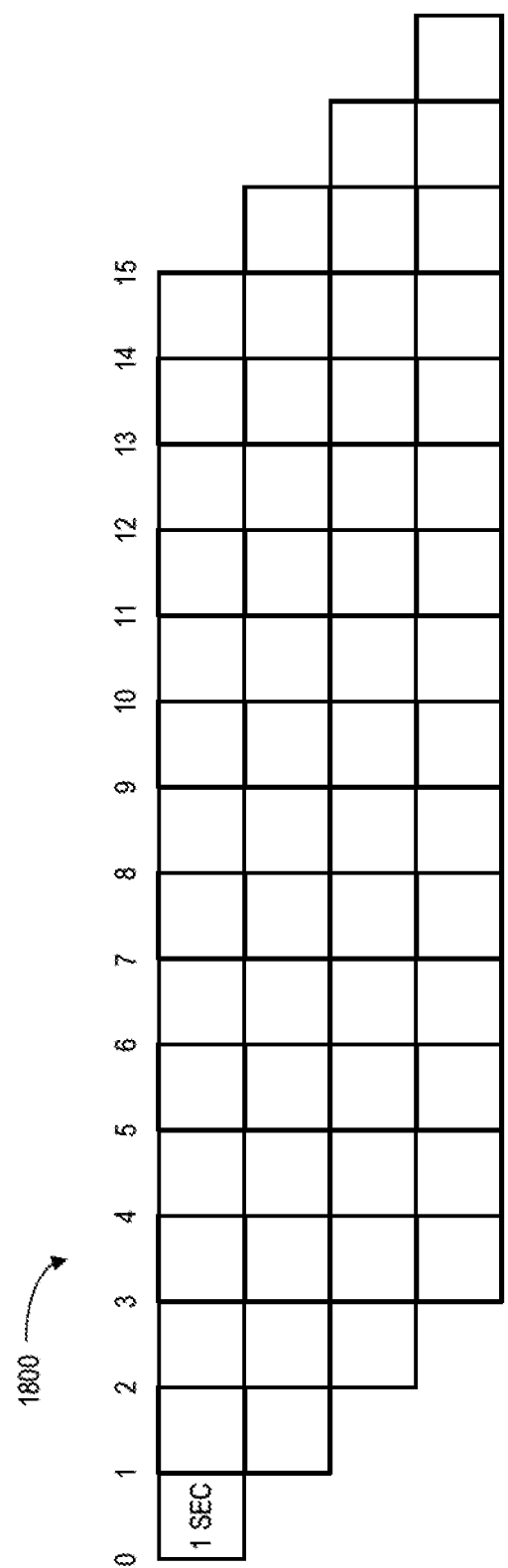
FIG. 18 illustrates a sliding window technique for real-time measurements in accordance with some embodiments.

FIG. 17 shows an architecture for an autonomous reconfigurable virtual sensing system 1700. The system 1700 receives time-series measurements 1720 of the sensors as inputs. The measurements are pre-filtered 1720 for denoising and outlier removal. Denoising may be done, for example, by low pass filtering using law pass filters whose individual cut-off frequencies may be turned based on the individual bandwidths of each sensor. Outlier removal might be performed online by computing the standard deviation of measurements over a sliding window. For example, FIG. 18 illustrates a sliding window 1800 including a series of values per second. Referring again to FIG. 17, feature extraction 1740, anomaly detection 1750, and localization techniques 1754 may be used to determine 1752 if there is any anomaly in the sensor (and to specify the particular anomalies). When an anomaly or abnormality exists in the system 1700, all the sensor measurements may be passed, via an indexed selector 1730, to a dynamic, resilient sensing system 1780 that uses an online continuous learning technique in accordance with any of the embodiments described herein. When there is an abnormality, the sensors that are determined by conformance matrix logic 1760 as an independent anomaly (i.e., and not an artifact of the propagation of other anomalies through the system 1700) are removed 1770 and the uncomplimented subset of sensors are passed to the dynamic, resilient sensing system 1780. For example, the system 1700 may have N sensors, of which p sensors are normal and q sensors are independently abnormal. Note that both p and q are time-varying but p[k]+q[k]=N at each time instant k. The p normal sensors are specified by the conformance matrix logic 1760 and down-selected via the indexed selector 1730 to be inputted to the dynamic, resilient sensing system 1780. Note that the normal subset may be continuously changing and, as a result, the internal learning configuration of the dynamic, resilient sensing system 1780 is also changing. The online continuous learning is used to learn a (potentially) nonlinear, time-varying, and variable-structure function $f$ that relates the next-step values of the sensors estimates to the current and lagged values of the sensor estimates (i.e., outputs of the dynamic, resilient estimator) and the current and lagged values of the normal sensor measurement (i.e., inputs of the dynamic, resilient estimator) as follows:

$$\hat{S}=[\hat{S}_1 \ \hat{S}_2 \ \ldots \ \hat{S}_N]^T$$

$$\hat{S}^n=[\hat{S}_1^n \ \hat{S}_2^n \ \ldots \ \hat{S}_p^n]^T, \hat{S}^a=[\hat{S}_1^a \ \hat{S}_2^a \ \ldots \ \hat{S}_q^a]^T$$

$$\hat{S}[K+1]=f(\hat{S}[k], \ldots, \hat{S}[k-l], \hat{S}^n[k], \ldots, \hat{S}^n[k-m], k)$$

where l and m are the number of lags used for outputs and inputs, respectively; and the normal and abnormal sensors are depicted with superscripts, n and a, respectively. Note that both l and m might also be found automatically online and they might be time varying as well, hence making $f$ a variable structure. For substantially large-scale systems, a sparsity structure might be exploited in the dynamic, resilient sensing system 1780 to have a reduced-order observer, or to have a full order observer in which continuous learning computations may applied at each configuration change event until convergence is achieved. Estimator parameters may then remain constant until the next configuration change occurs.

Some embodiments described herein may work in a feature space of much smaller dimension (as compared to the sensor space) and cast the problem as a generic optimization problem. Such an approach may not need training associated with specific attack scenarios, thus reducing development time and making the approach scalable. Moreover, because only a single model is required for each of feature extraction and reconstruction, the memory requirements may be substantially reduced.

Embodiments may provide a resilient estimation method for sensors of a control system to maintain the integrity and availability of the system during abnormalities such as cyber-attacks, sensor faults, and/or sensor failures. The system may receive time-series data from a collection of sensors and replace attacked or faulty sensors with virtual estimates as soon as detection, localization, and/or conformance matrix logic sub-modules (e.g., of a sensor diagnostics and anomaly classification module) identify the problem. For each compromised sensor, the system may construct a virtual estimator that uses the uncompromised sensors. Each of such virtual estimators may use all or a subset of the remaining healthy sensors.

Figure 19:
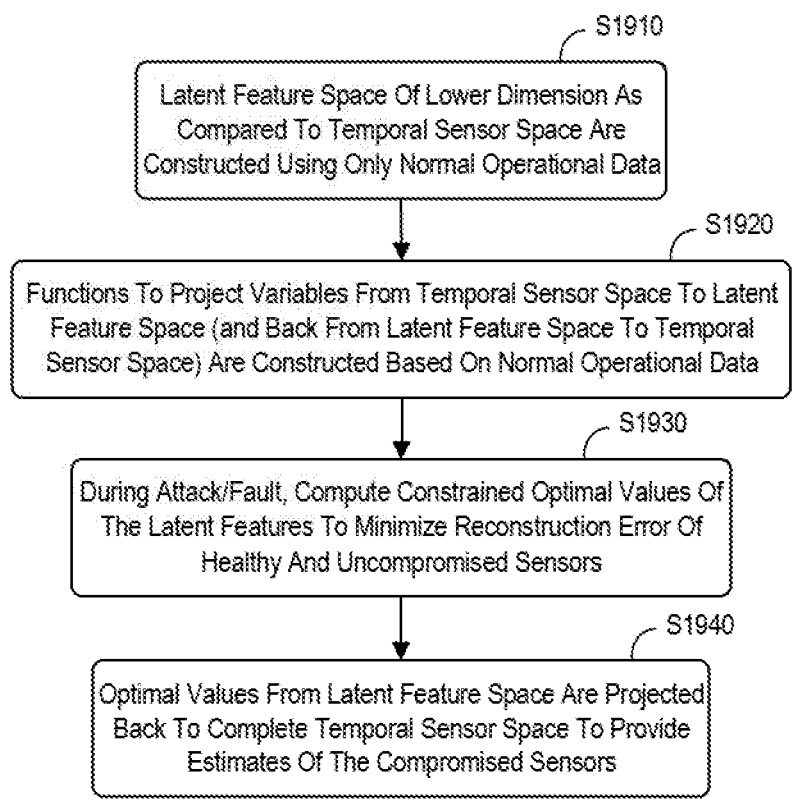
FIG. 19 is a method according to some embodiments.

FIG. 19 is a method according to some embodiments. At S1910, a latent feature space of lower dimension as compared to the temporal sensor space may be constructed using only normal operational data. At S1920, the functions to project the variables from temporal sensor space to latent feature space (and back from latent feature space to temporal sensor space) are constructed based on normal operational data. During an attack or fault, constrained optimal values of the latent features are computed to minimize the reconstruction error of the healthy and uncompromised sensors at S1930. At S1940, the optimal values from latent feature space are then projected back to the complete temporal sensor space to provide estimates of the compromised sensors.

Consider, for example, a discrete time system where the sampling time is $T_s$ and any time point, t, can be approximated by an integer k: $t_k$=k$T_s$ such that t≅$t_k$. The temporal sensor space $\mathfrak{S} \in \mathbb{R}^{N_s \times w}$ contains time series information of $N_s$ sensors over a window of w samples. The latent feature space $\mathfrak{F} \in \mathbb{R}^{N_f}$ contains the $N_f$ features extracted from the temporal sensor space with $N_f$<<$N_s$×w. The advantage of operating on a space with reduced dimensions is the reduced computational complexity that makes the reconstruction optimization problem more tractable.

A goal of the feature extraction phase may be to derive the encoding map $\mathcal{E}: \mathfrak{S} \rightarrow \mathfrak{F}$ from the sensor space to the feature space and the decoding map $\mathcal{D}: \mathfrak{F} \rightarrow \mathfrak{S}$ from the feature space back into the temporal sensor space in such a way that minimizes the reconstruction error of the healthy sensors. In other words, an optimization problem is solved:

$$\arg\min_g \|X_h - \widetilde{X}_h\| \text{ subject to } g_{LB} \leq g \leq g_{UB},$$

where $X_h \in \mathfrak{S}$ represents the healthy sensors in temporal sensor space, $\widetilde{X}_h \in \mathfrak{S}$ represents the model-predicted healthy sensor values and $\{g, g_{LB}, g_{UB}\} \in \mathfrak{F}$ represent the system state in the feature space, its lower and upper bounds, respectively. Note that the model for $\widetilde{X}_h$ involves the decoding map function: $\widetilde{X}_h = f(u_{critical}, \mathcal{D}(g))$, where $f$ represents the predictive model that uses the critical subset of measurements, $u_{critical}$ together with the decoded features.

Embodiments of the encoder-decoder map may include: (i) a Principal Component Analysis ("PCA"), and (ii) deep autoencoders. Note, however, that any encoder-decoder map that captures the important characteristics of the temporal sensor space might be embedded in the described optimization problem and is therefore a candidate for this approach.

Figure 20:
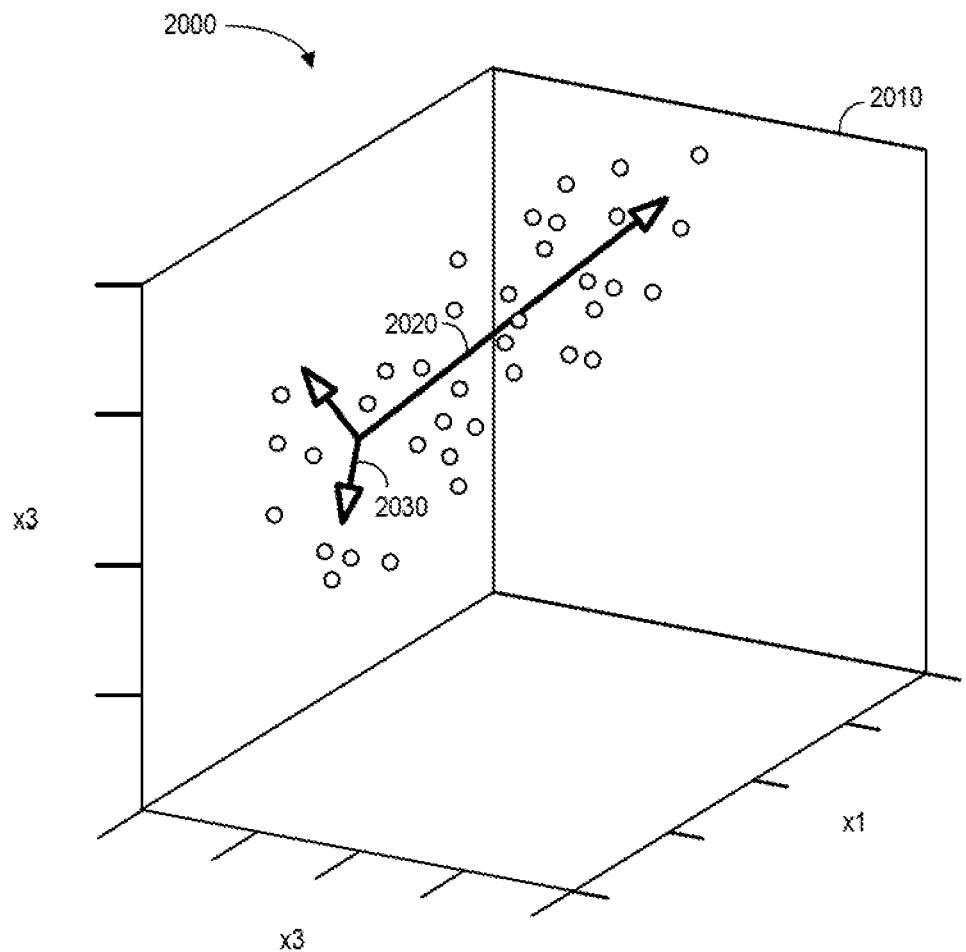
FIG. 20 is an example of features in principal component space in accordance with some embodiments.

FIG. 20 is an example 2000 of features in Principal Component ("PC") space in accordance with some embodiments. The FIG. includes a three-dimensional graph 2010 of a feature associated with three variables: x1, x2, and x3. According to some embodiments, two PCs may be sufficient to capture the variation of the normal operational dataset. The optimization problem may solve for the optimal coordinates in the latent feature space, $g_1$ 2020 and $g_2$ 20230. In this example, the temporal sensor space is three-dimensional, $\mathfrak{S} \in \mathbb{R}^3$, and the latent feature space is two-dimensional, $\mathfrak{F} \in \mathbb{R}^2$.

In the PC-based method, the encoding map may be the principle component projection of the sensor space to the latent feature space and the corresponding linear reconstruction map may be used as the decoder function. The PC space (i.e., the latent feature space) may be obtained by finding the dominant eigenvectors of the covariance of the normal operational data. The PCA-based approach may have the advantage of using a set of affine transformations, which allows the optimization problem to be solved for reconstruction during attack to remain convex thereby guaranteeing a global optimality of the solution.

Figure 21:
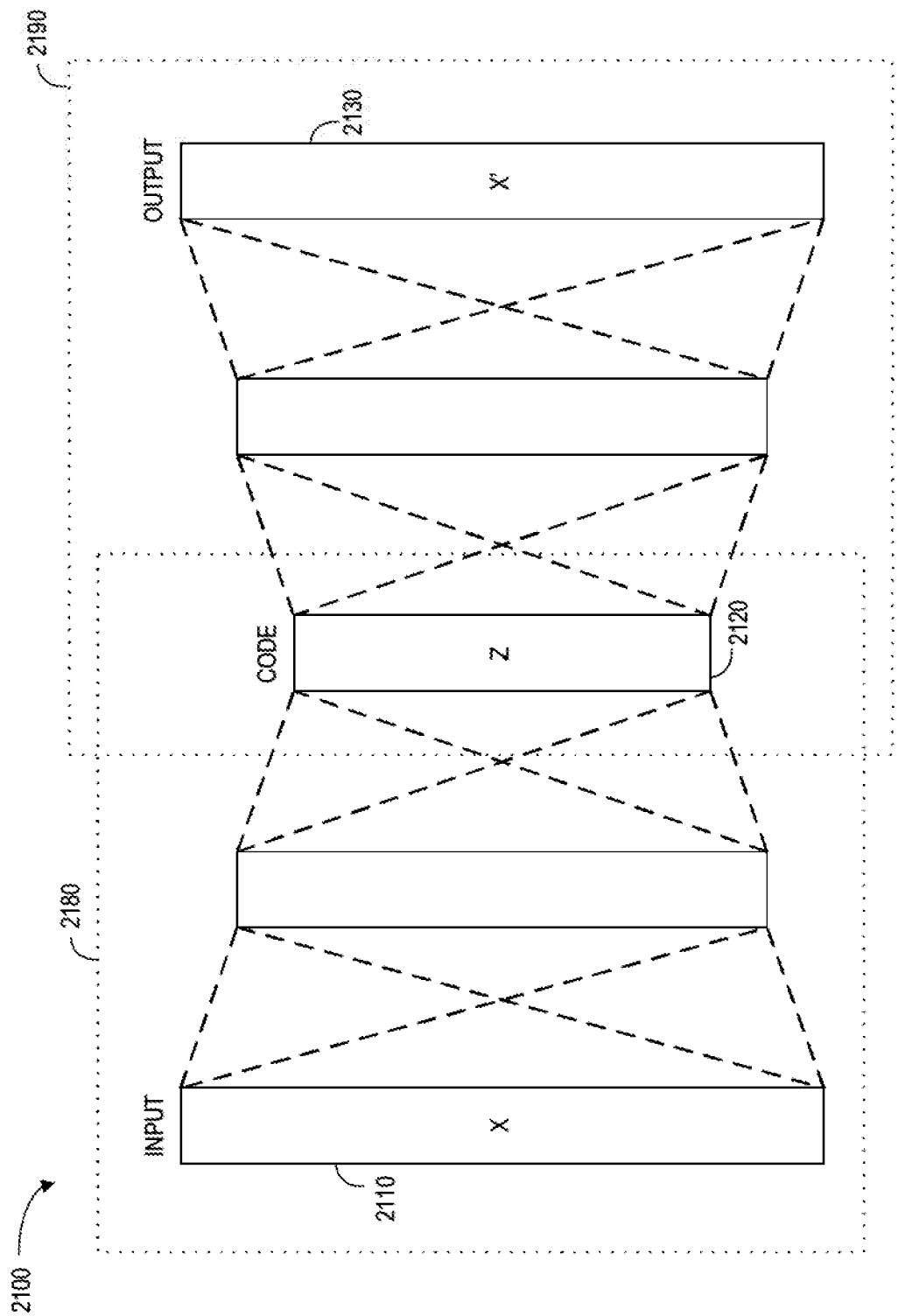
FIG. 21 is an example of an auto-encoder including encoder and decoder parts according to some embodiments.

FIG. 21 is an example 2100 of an auto-encoder including encoder and decoder parts according to some embodiments. An encoder 2180 portion includes an input 2110 (x) and code 2120 (Z). A decoder 2190 portion includes the code 2120 (Z) and an output 2130 (x'). Note that an ability to model nonlinear and more complex set of transformations may gained by using deep autoencoders instead of PCA. In this case, the transformations that are used are not linear and the convexity of the optimization problem (and therefore the global optimality guarantee) is lost. However, the use of nonlinear transformations in many scenarios would achieve a better cost function value for the aforementioned optimization problem and thus represents a better approximation. A deep Convolutional Neural Network or Recurrent Neural Network ("RNN) may be used to construct the autoencoder and be trained using only normal operational data. Once trained, the autoencoder network can be readily decomposed into the encoder and decoder maps where the output at the bottleneck constitutes the latent feature space.

To identify the optimal values of the feature vectors during an attack, the following optimization problem might be solved:

$$\arg\min_l C(X_h - f(u_{critical}, \mathcal{D}(l)))$$

where $C: \mathfrak{S} \to \mathbb{R}$ is the cost function to be minimized and $l \in \mathfrak{F}$ is the feature vector whose reconstruction minimizes the error between the unattacked healthy measurements, $X_h$, and estimates of the healthy sensor, $\mathcal{D}(l)$. The optimization problem may preferably be constrained as described previously but can also be unconstrained, as shown above, based on the system and sensor characteristics. The cost function can be created in various ways where less or zero weights are given to the compromised sensor measurements and higher weights are given to uncompromised sensor measurements. The weights can be a continuous function of the confidence levels that particular sensors are attacked. In some embodiments, the optimization problem is a Quadratic Programming ("QP") problem for the PCA case that is solved by an active-set QP solver and a Non-linear Programming Problem ("NLP") for the auto-encoder case that is solved by a Sequential Quadratic Programming ("SQP") solver. However, it should be noted that any numerical nonlinear programming solver or a heuristic optimization problem solution method would be equally applicable toward solving the virtual sensing optimization problem.

Figure 22:
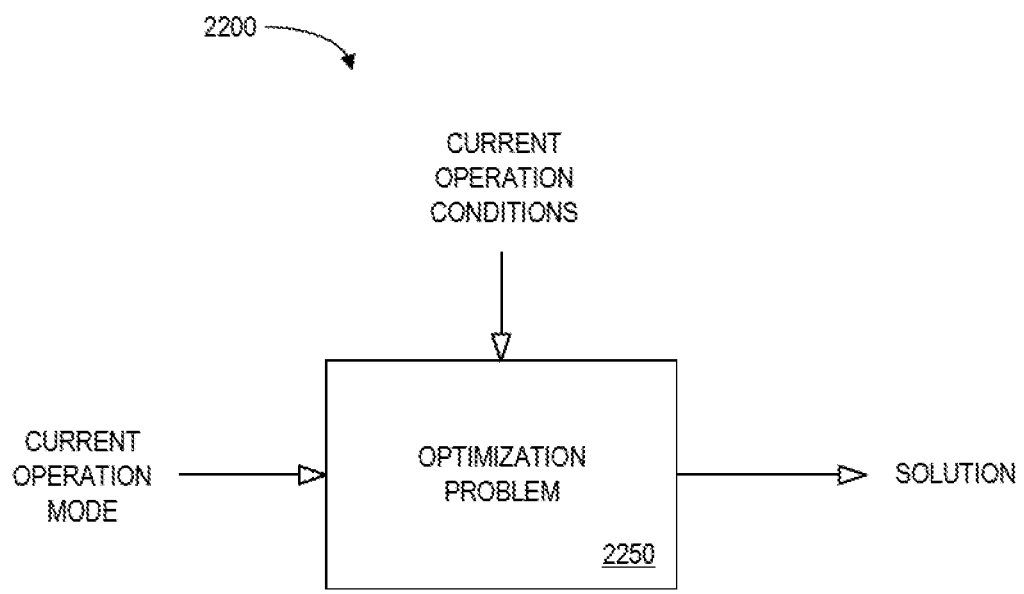
FIG. 22 illustrates a system associated with an optimization problem in accordance with some embodiments.

FIG. 22 illustrates a system 2200 associated with an optimization problem 2250 in accordance with some embodiment. To help ensure that the optimization problem 2250 results in realistic feature space coordinates, bounds on the values of the feature vector may be provided as constraints to the optimization problem. Such bounds might be derived, for example, based on an analysis of the sensor data to study the excursion regions of the feature vectors and/or based on the knowledge of the physics of the system. The rate bounds might, according to some embodiments, be functionalized on a current operation mode and current operation conditions.

The initialization of the optimization problem might be done, according to some embodiments, using a feature set extracted from the last known health set of values. For future iterations, the reconstructed values might be used for initializations.

Finally, a limit may be put on the increment that can happen to the reconstructed values from the previous time-step (i.e., rate limits in the feature space) to help ensure bumpless transfer to a fault condition and to help ensure realistic time-dependent behavior of the virtual sensors. Again, such rate bounds can be derived based on analysis of the normal sensor dataset as well as knowledge of the system characteristics. The rate bounds may, in some embodiments, be functionalized based on a current operation mode and current operation conditions.

Thus, some embodiments may provide a scalable architecture that requires no knowledge of an attack surface and/or attack type. Embodiments may be suitable for real-time applications because the problem is cast in as an optimization problem that can be solved efficiently in real-time. Moreover, operation mode dependent programming of upper, lower, and/or rate bounds on the optimization problem may help provide: (i) realistic sensor reconstructions, (ii) smooth and bumpless time variation of the virtual estimates, and/or (iii) an efficient solution to the optimization problem. Further, embodiments may provide relatively memory-efficient modeling.

Figure 23A:
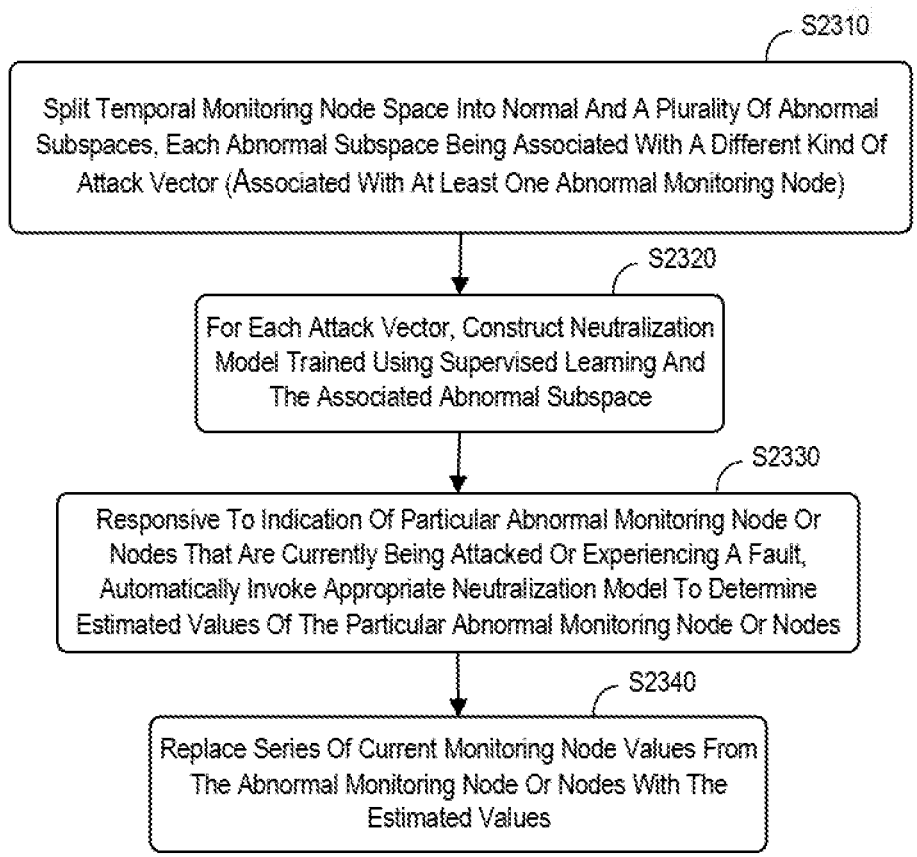
FIGS. 23A and 23B are methods in accordance with some embodiments.

According to some embodiments, supervised learning may further enhance cyber-attack neutralization. For example, FIG. 23A is a method in accordance with some embodiments (further described in connection with FIGS. 24 and 25). At S2310, a dynamic, resilient estimator may split a temporal monitoring node space into a normal subspace and a plurality of abnormal subspaces, each abnormal subspace being associated with a different kind of attack vector. Each attack vector may be according to some embodiments, associated with at least one abnormal monitoring node.

Figure 23B:
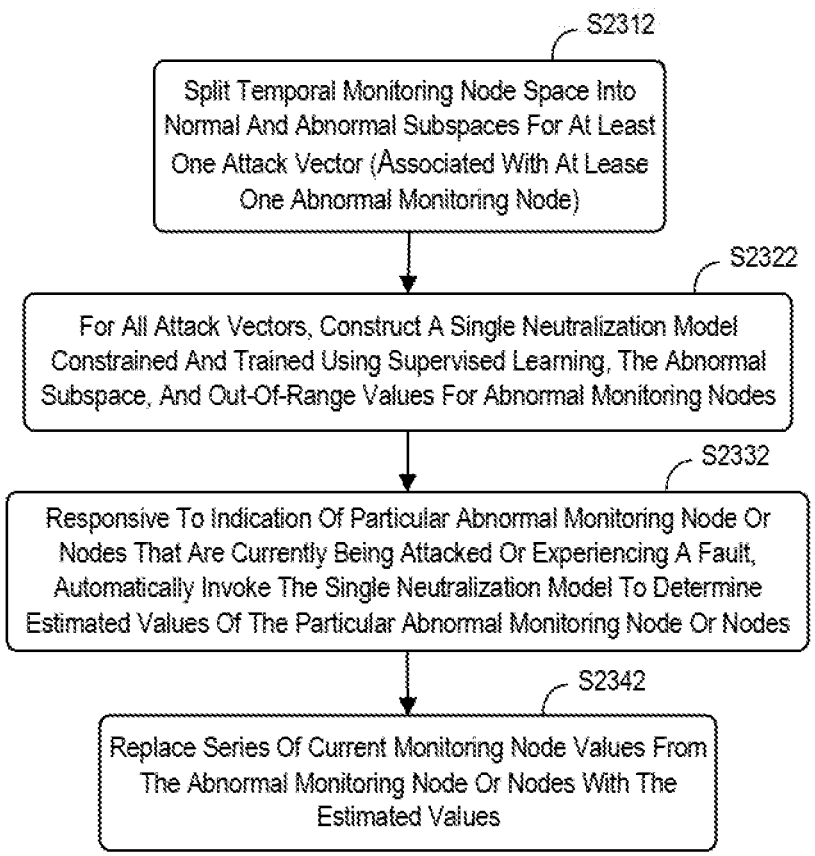

For each attack vector, at S2320 the system may construct a neutralization model trained using supervised learning and the associated abnormal subspace. Responsive to an indication of a particular abnormal monitoring node or nodes that are currently being attacked or experiencing a fault, at S2330 the system may automatically invoke the appropriate neutralization model to determine estimated values of the particular abnormal monitoring node or nodes. At S2340, the series of current monitoring node values from the abnormal monitoring node or nodes may be replaced with the estimated values. According to other embodiments, supervised learning may further enhance cyber-attack neutralization. For example, FIG. 23B is a method in accordance with some embodiments (further described in connection with FIGS. 26 and 27). At S2312, a dynamic, resilient estimator may split a temporal monitoring node space into a normal subspace and an abnormal subspace for each of at least one attack vector. Each attack vector may be according to some embodiments, associated with at least one abnormal monitoring node.

For all attack vectors, at S2322 the system may construct a single neutralization model constrained and trained using supervised learning, the abnormal subspace, and out-of-range values for abnormal monitoring nodes. Responsive to an indication of a particular abnormal monitoring node or nodes that are currently being attacked or experiencing a fault, at S2332 the system may automatically invoke the single neutralization model to determine estimated values of the particular abnormal monitoring node or nodes. At S2342, the series of current monitoring node values from the abnormal monitoring node or nodes may be replaced with the estimated values.

In this way, embodiments may provide a resilient estimation method for sensors of a control system to maintain the integrity and availability of the system under abnormalities such as cyber-attacks and sensor faults and/or failures. The system may receive time-series data from a collection of sensor monitoring nodes and replace independently attacked and/or faulty sensors with their virtual estimates after the problem is reported by detection, localization and conformance matrix logic and/or a sensor diagnostics and anomaly classification model. Moreover, neutralization models may be developed for the attack vectors in the attack surface from normal operation data. The suitable model may then be invoked during an attack to reconstruct the compromised sensor values from the uncompromised sensor values.

The temporal sensor space $\mathfrak{S} \in \mathbb{R}^{N_s \times w}$, which contains the time series information of $N_s$ sensors over a window of $w$ samples, may be split into two subspaces $\mathfrak{S}_h \in \mathbb{R}^{N_h \times w}$ and $\mathfrak{S}_a \in \mathbb{R}^{N_a \times w}$ for each attack vector $\mathcal{A} \in \mathfrak{A}$, where $\mathfrak{A}$ is the attack surface under consideration and $\mathfrak{S} = \mathfrak{S}_h \cup \mathfrak{S}_a$. $N_h$ and $N_a$ are respectively the number of healthy sensors and attacked sensors in the attack vector with $N_s = N_a + N_h$.

For each $\mathcal{A} \in \mathfrak{A}$, a neutralization model $\mathcal{N} \in \mathfrak{N}: \mathfrak{S}_h \rightarrow \mathfrak{S}_a$ may be constructed and trained with appropriately segmented normal data. During an attack, a detection and localization module may identify the attack vector $\mathcal{A}$ and the corresponding neutralization model N may be invoked to reconstruct the values of the healthy sensors from the attacked sensors. In the supervised learning approach to neutralization, a goal may be to train the models to predict information in $\mathfrak{S}_a$ based on information available in $\mathfrak{S}_h$. Note that the models might be structured in a few different ways to achieve this.

Figure 24:
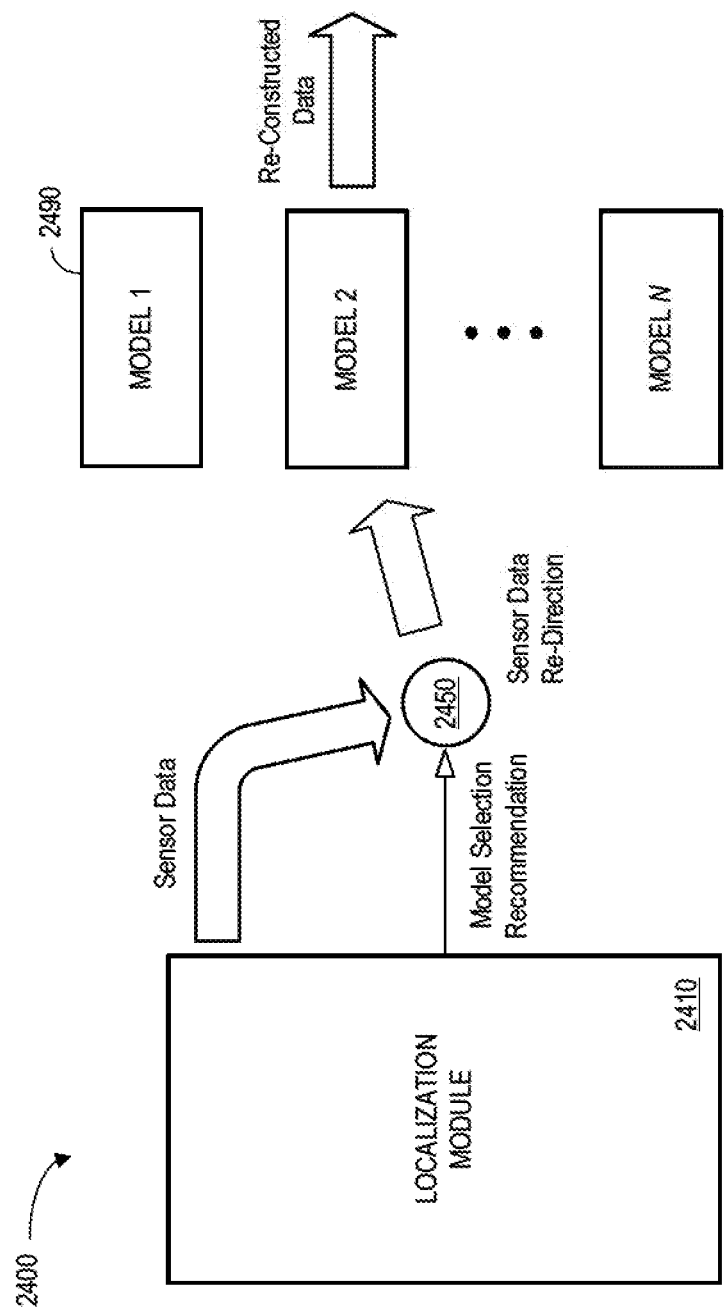
FIG. 24 is a schematic showing a multiple model approach for neutralization according to some embodiments.

For example, FIG. 24 is a schematic of a system 2400 showing a "multiple model" approach for neutralization according to some embodiments. The system 2400 includes a localization model 2410 that reports a problem (cyber-attack or fault) and a sensor data re-direction element 2450 that routes sensor data to an appropriate one of a set of neutralization models 2490 (e.g., models 1 through N in FIG. 24). Here, the individual models 2490 (1 through N) are developed for each attack vector in the catalogue which are trained offline. During deployment, a sensor data redirection switch (element 2450) redirects the data stream to the appropriate model 2490 based on the recommendation of the localization module so that compromised sensors can be appropriately reconstructed.

In this approach, one model 2490 is trained for each attack vector. The available normal dataset is segmented to fabricate healthy sensor space $\mathfrak{S}_h$, which is the input to the model and ideal training values/tags for the attacked sensor space $\mathfrak{S}_a$, which is the output of the model. Given enough normal dataset, $\mathfrak{S}_h$ and $\mathfrak{S}_a$ can be constructed for all attack vectors $\mathcal{A} \in \mathfrak{A}$ to train the respective models. The models may be associated with a supervised learning technique (e.g., deep Recurrent Neural Network ("RNN"), a Convolutional Neural Network ("CNN"), a combination of RNN and CNN, or any other supervised learning technique) capable of exploiting correlations in multiple dimensions (in this case temporal and across multiple sensors) and also be relatively easy to deploy for substantially real time applications. Moreover, a generative network model (such as an autoencoder, a Generative Adversarial Network ("GAN") or any other generative network) may be constructed on top of the base models to gracefully accommodate scenarios not encountered during the training phase.

Figure 25:
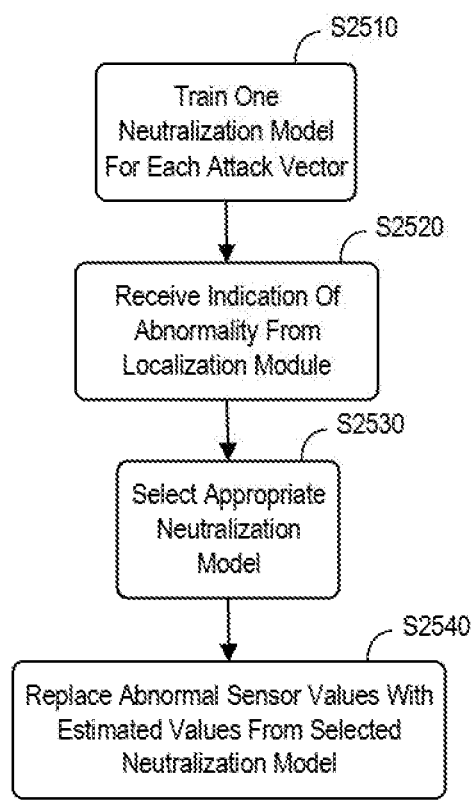
FIG. 25 is a multiple model method in accordance with some embodiments.

FIG. 25 is a multiple model method in accordance with some embodiments. At S2510, a single neutralization mode is trained for each attack vector (e.g., if there are ten sensors s1 through s10, a model might be created for s1 only being attacked, s1 and s2 being attacked, s2 only being attacked, etc.). At S2520, an indication of abnormality is received from a localization module (e.g., indicating which sensors are currently abnormal). At S2530, the appropriate neutralization model is selected and used to replace the abnormal values with estimated, virtual values at S2540.

Figure 26:
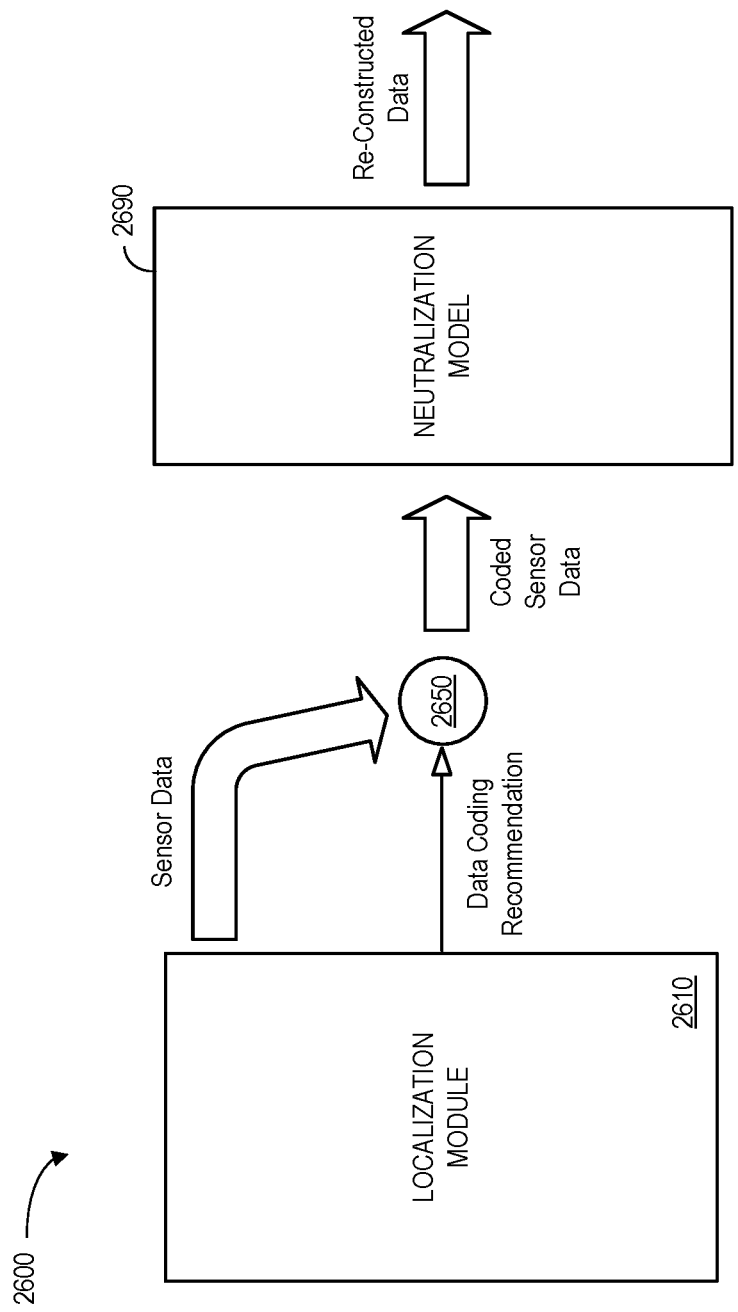
FIG. 26 is a schematic showing a single model approach for neutralization according to some embodiments.

As another approach, FIG. 26 is a system 2600 schematic showing a "single model" approach for neutralization according to some embodiments. A localization module 2610 provide an indication of abnormality to a data coder 2650 when provides coded sensor data to a neutralization model 2690. Here, the single model 2650 is developed and trained offline or using the online dynamic resilient estimator (as described in FIG. 17) over all the attack vectors in the catalogue, and the data streams from the attacked nodes are coded appropriately. During deployment, a data coder switch (2650) codes the data stream from the attacked sensors appropriately based on the recommendation of the localization module 2610 so that compromised sensors can be appropriately identified and reconstructed by the neutralization module 2690.

This approach is conceptually similar to the multiple model approach besides the fact only a single model is trained for all attack vectors. To achieve this, the normal data set is segmented in a similar fashion as before. However, to construct training inputs, the system keeps the $\mathfrak{S}_h$ as before and encodes the attacked sensor space with out-of-range values (values that the sensors are not expected to encounter during normal or attack scenarios) to create a fake input space $\mathfrak{S}_i$ having the same dimensions as $\mathfrak{S}$. The encoding map may be a set of predetermined and/or constant values or may be chosen dynamically based on the range of the healthy sensors to maximize performance. Similarly, for the fake output space $\mathbb{S}_o$, the values from $\mathbb{S}_a$ may be preserved and the healthy sensor space is padded. In this way, $\mathbb{S}$, $\mathbb{S}_i$, and $\mathbb{S}_o$ may all have the same dimensions and a single model (with $N_s$ inputs and $N_s$ outputs) may be be trained for neutralization with methods to appropriately pad input data in an attack scenario. As before, supervised learning may be the models of choice (but other approaches might also be used). A generative network may be constructed on top of other models to accommodate unforeseen scenarios. The single model approach may reduce accuracy in favor or memory savings as compared to the multiple model approach.

Figure 27:
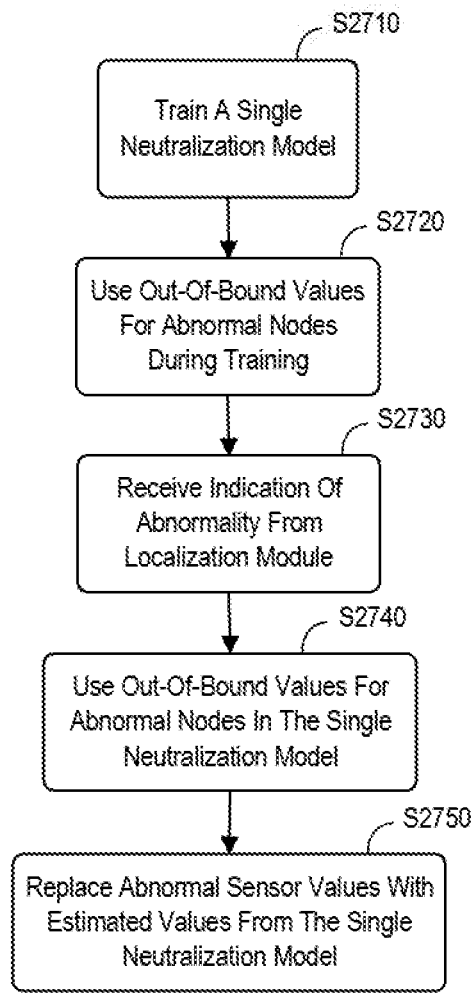
FIG. 27 is a single model method in accordance with some embodiments.

FIG. 27 is a single model method in accordance with some embodiments. At S2710, the system trains a single neutralization model. At S2720, out-of-bound (out-of-range) values may be coded for abnormal nodes during the training. An indication of abnormality is received from a localization module at S2730, and out-of-bound values are provided to the neutralization model for the abnormal nodes at S2740. At S2750, the abnormal sensor values are replaced with estimated, virtual values at S2750 to simulate sensor operation based on the values that are currently being provided by healthy monitoring nodes.

Figure 28:
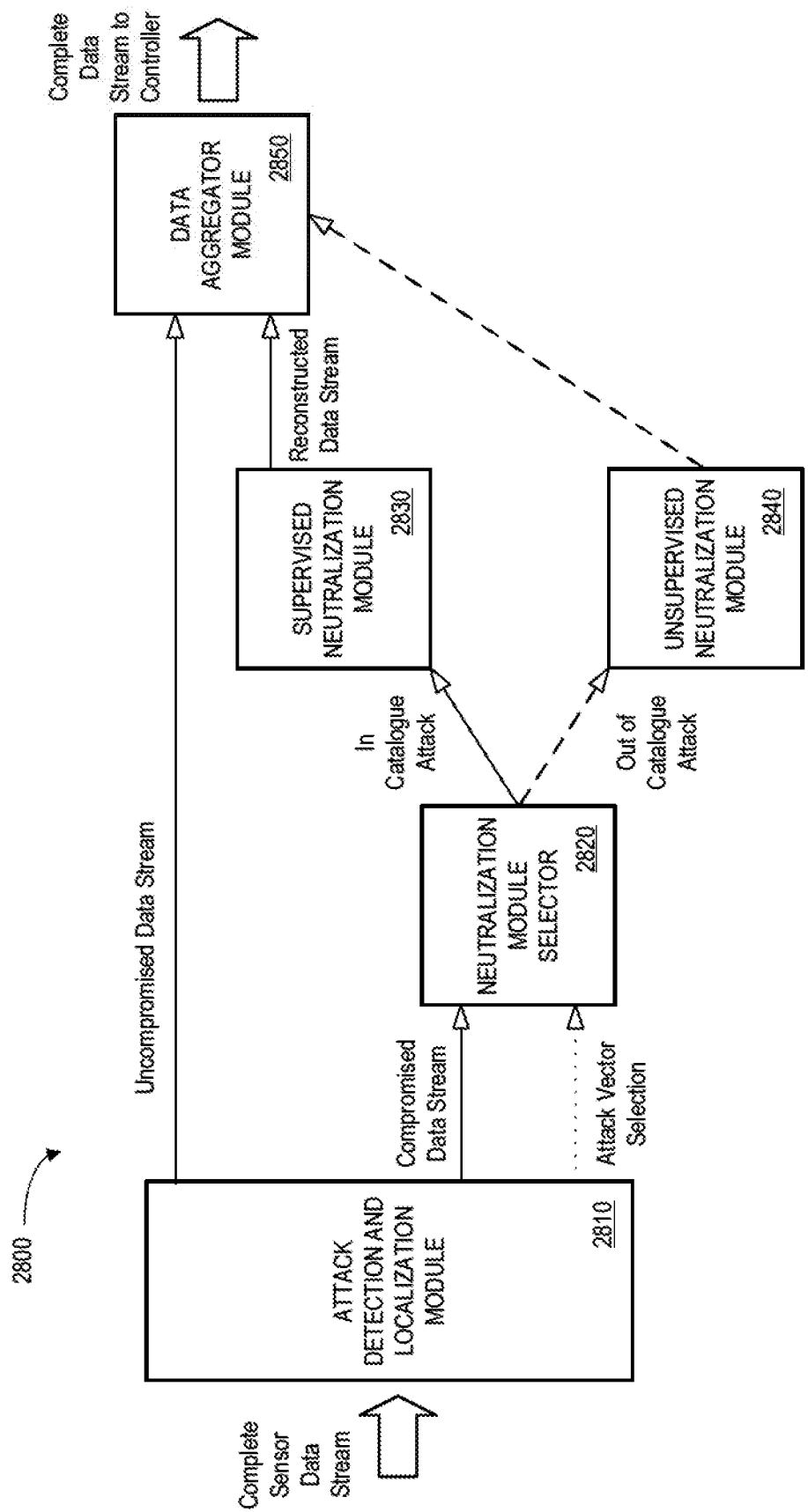
FIG. 28 is schematic showing a two-layer method (deploying supervised and unsupervised neutralization algorithms simultaneously according to some embodiments.

FIG. 28 is schematic showing a "two-layer" method (deploying supervised and unsupervised neutralization algorithms simultaneously) according to some embodiments. An attack detection and localization module 2810 receives a complete sensor stream and provides a comprised data stream to a neutralization module selector 2820 along with an attack vector selection. If the attack vector is "in catalogue" and therefore a dedicated supervised neutralization module 2830 has already been trained, then that model is selected (the "first layer as described with respect to FIGS. 24 and 25). If the attack vector is "out of catalogue" and therefore no dedicated supervised neutralization module 2830 has already been trained, then a single unsupervised neutralization model 2840 is selected instead (the "second layer" as described with respect to FIGS. 26 and 27). The selected model is then used to provide information to a data aggregator module 2850. The neutralization module selector 2820 thus acts as an arbitrator to select the reconstruction module based on output of the attack detection and localization module 2810. If the attack vector in question is included in the training catalogue for the supervised module 2830, then the supervised module 2830 is selected for neutralization. Otherwise, the unsupervised module 2840 is selected for neutralization. Finally, the data aggregator module 2850 may take the uncompromised data stream and reconstructed data stream (for compromised nodes) and put them together so that a controller will receives the data stream in an expected format.

For the multiple model architecture, a model selector module may reside between a detection and localization module and an actual neutralization module to invoke the correct model for the given attack vector as shown FIG. 24. For the single model architecture, a coding module needs to be inserted instead to replace the compromised sensor data-stream with out-of-bound values so that the neutralization module can recognize the attack vector and act accordingly. For either case, a deep neural network-based model architecture may be fairly standard to deploy on a Graphical Processing Unit ("GPU") and/or a Tensor Processing Unit ("TPU") to achieve a substantially real time prediction. Finally, this may be combined with the unsupervised neutralization methodologies described herein where the unsupervised methodology acts as a first line of defense and the supervised methodology is deployed for scenarios where the other approach does not meet a required prediction accuracy. In this way, the models described may be trained using only on a subset of the attack surface (and hence require less development time).

Figure 29:
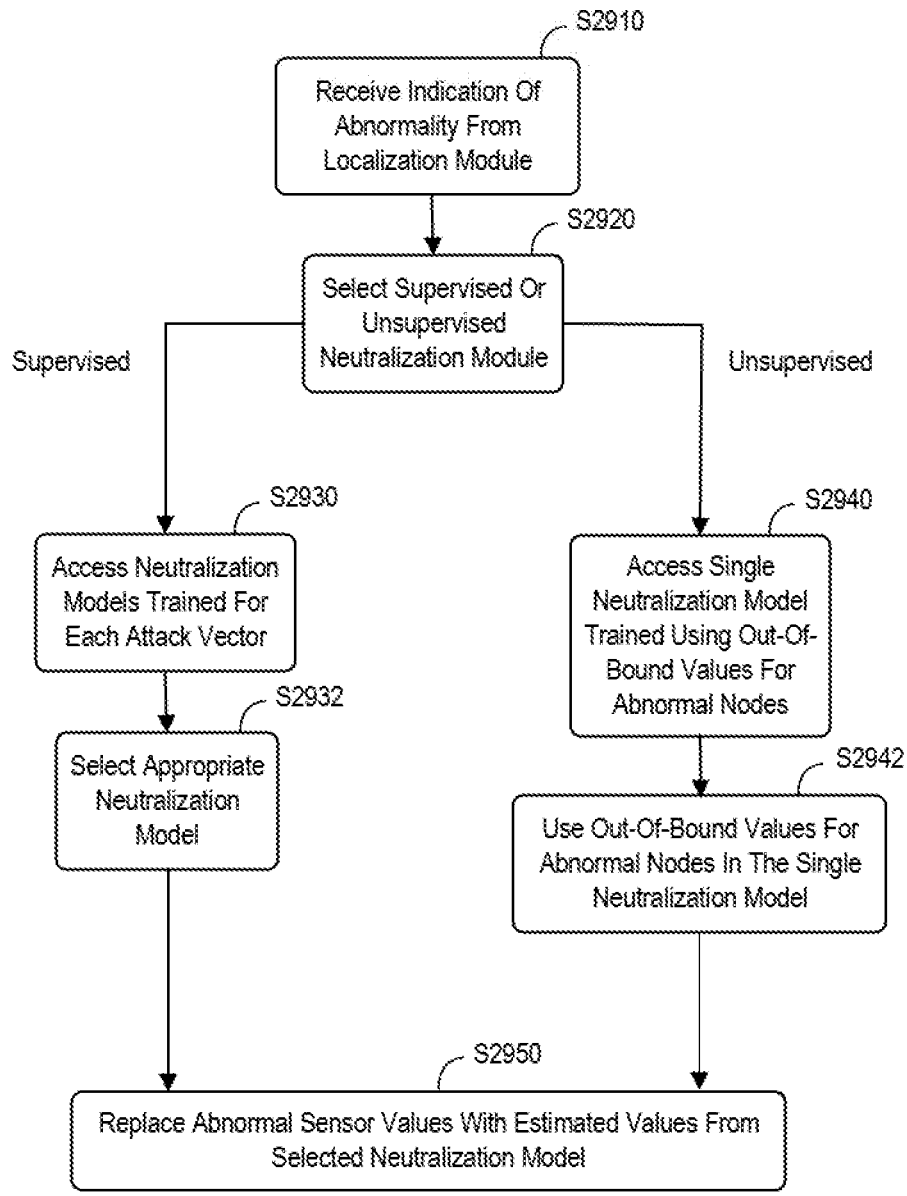
FIG. 29 is a two-layer method in accordance with some embodiments.

FIG. 29 is a two-layer method in accordance with some embodiments. At S2910, the system receives an indication of abnormality from a localization module (e.g., indicating which nodes are currently being attacked or experiencing a fault). At S2920, the system selects a supervised or unsupervised neutralization module (based on the nodes being attacked or experiencing a fault). If supervised is selected at S2920, models trained for each attack vector are accessed at S2930 and the appropriate supervised model may be selected at S2932. If unsupervised is selected at S2920, a single neutralization model (trained with out-of-bound values inserted for faulty nodes) is accessed at S2940, and out-of-bounds values are coded into the data stream for currently attacked and/or faulty nodes at S2942. In either case, the abnormal sensor values are replaces with estimated, virtual values from the selected neutralization model (generated based on healthy data) at S2950.

Thus, some embodiments may provide a scalable architecture and minimal reliance on attack data. Moreover, embodiments may be suitable for real time application because the attack models may be implemented as deep neural networks that are amenable to executed by a GPU or a TPU. Moreover, modeling approaches described herein may be relatively memory efficient.

Figure 30:
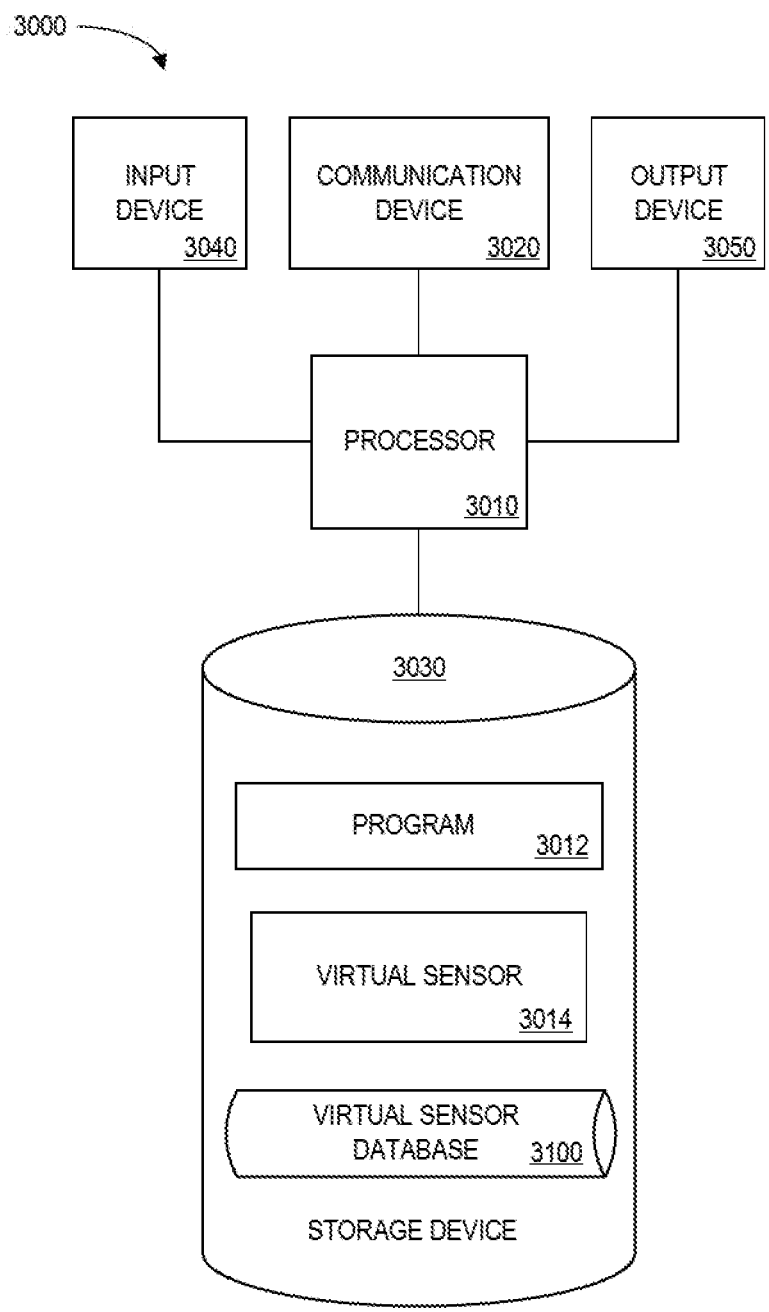
FIG. 30 is a block diagram of an industrial asset protection platform according to some embodiments of the present invention.

The embodiments described herein may be implemented using any number of different hardware configurations. For example, FIG. 30 is a block diagram of an industrial asset protection platform 3000 that may be, for example, associated with the systems 100, 300, 800, 1000 of FIGS. 1, 3, and 10A respectively. The industrial asset protection platform 3000 comprises a processor 3010, such as one or more commercially available Central Processing Units ("CPUs") in the form of one-chip microprocessors, coupled to a communication device 3020 configured to communicate via a communication network (not shown in FIG. 30). The communication device 3020 may be used to communicate, for example, with one or more remote monitoring nodes, user platforms, digital twins, etc. The industrial asset protection platform 3000 further includes an input device 3040 (e.g., a computer mouse and/or keyboard to input virtual sensor parameters, localization data, modeling information, etc.) and/or an output device 3050 (e.g., a computer monitor to render a display, provide alerts, transmit recommendations, and/or create reports). According to some embodiments, a mobile device, monitoring physical system, and/or PC may be used to exchange information with the industrial asset protection platform 3000.

The processor 3010 also communicates with a storage device 3030. The storage device 3030 may comprise any appropriate information storage device, including combinations of magnetic storage devices (e.g., a hard disk drive), optical storage devices, mobile telephones, and/or semiconductor memory devices. The storage device 3030 stores a program 3012 and/or a virtual sensor model 3014 for controlling the processor 3010. The processor 3010 performs instructions of the programs 3012, 3014, and thereby operates in accordance with any of the embodiments described herein. For example, the processor 3010 may split a temporal monitoring node space into normal and one or more abnormal subspaces associated with different kinds of attack vectors. According to some embodiments, a neutralization model may be constructed and trained for each attack vector by the processor 3010 using supervised learning and the associated abnormal subspace. In other embodiments, a single model may be created using out-of-range values for abnormal monitoring nodes. Responsive to an indication of a particular abnormal monitoring node or nodes that are currently being attacked or experiencing a fault, the processor 3010 may automatically invoke the appropriate neutralization model to determine estimated values of the particular abnormal monitoring node or nodes (e.g., by selecting the correct model or using out-of-range values). The series of current monitoring node values from the abnormal monitoring node or nodes may then be replaced by the processor 3010 with the estimated values.

The programs 3012, 3014 may be stored in a compressed, uncompiled and/or encrypted format. The programs 3012, 3014 may furthermore include other program elements, such as an operating system, clipboard application, a database management system, and/or device drivers used by the processor 3010 to interface with peripheral devices.

As used herein, information may be "received" by or "transmitted" to, for example: (i) the industrial asset protection platform 3000 from another device; or (ii) a software application or module within the industrial asset protection platform 3000 from another software application, module, or any other source.

In some embodiments (such as the one shown in FIG. 30), the storage device 3030 further stores a virtual sensor database 3100. An example of a database that may be used in connection with the industrial asset protection platform 3000 will now be described in detail with respect to FIG. 31. Note that the database described herein is only one example, and additional and/or different information may be stored therein. Moreover, various databases might be split or combined in accordance with any of the embodiments described herein.

Referring to FIG. 31, a table is shown that represents the virtual sensor database 3100 that may be stored at the industrial asset protection platform 3000 according to some embodiments. The table may include, for example, entries identifying industrial assets to be protected. The table may also define fields 3102, 3104, 3106, 3108, 3110, 3112, 3114 for each of the entries. The fields 3102, 3104, 3106, 3108, 3110, 3112, 3114 may, according to some embodiments, specify: an industrial asset identifier 3102, an industrial asset description 3104, a virtual sensor identifier 3106, a matrix 3108, description 3110, a status 3112, and a selected model 3114. The virtual sensor database 3100 may be created and updated, for example, when a new physical system is monitored or modeled, an attack is detected, etc.

The industrial asset identifier 3102 and industrial asset description 3104 may define a particular machine or system that will be protected. The virtual sensor identifier 3106 might be a unique alphanumeric code identifying a particular sensor being modeled for the industrial asset. The matrix 3108 might be associated with a correlation heat map or lookup table, the description 3110 might indicate what sensor is being estimated, and the status 3112 might indicate, for example, whether the associated monitoring node is operating normally or is currently undergoing a cyber-attack, experience a fault, and/or is being replaced (e.g., with a "predicted" value"). The selected model 3114 may be based, for example, on which model has been selected to created estimated, virtual values based on data from healthy sensors. The selected model 3114 might indicate, for example, that a "supervised" model should be used (along with an indication which model, among multiple potential models, should be used), a single "unsupervised" model should be used, etc.

Figure 32:
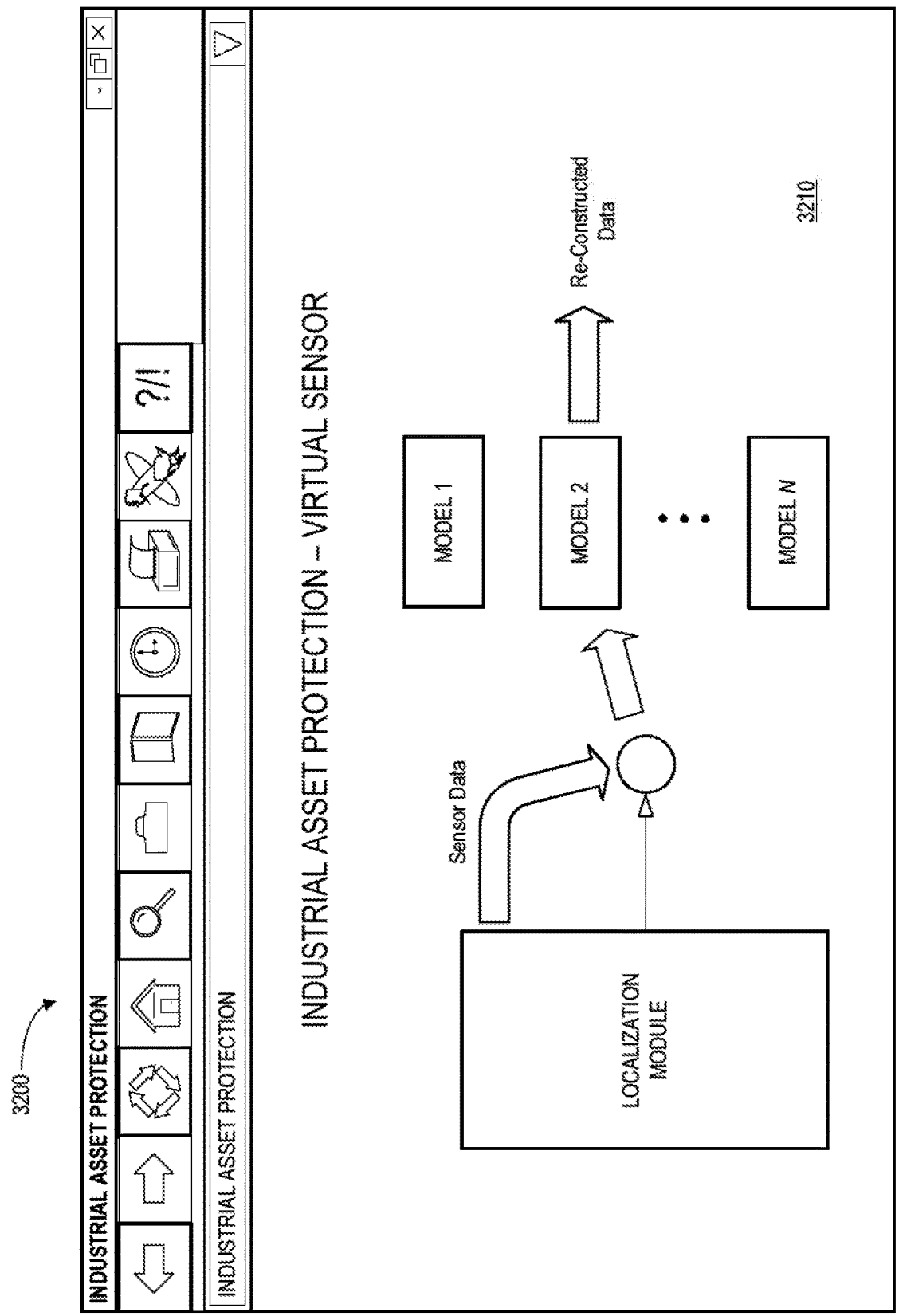
FIG. 32 is a virtual sensor display according to some embodiments.

FIG. 32 is an example of a virtual sensor display 3200 that might be used, for example, to provide information 3210 to an operator and/or to provide an interactive interface allowing an operator to adjust virtual sensors as appropriate. Selection of an element on the display 3200 (e.g., via a touchscreen) might, for example, result in the presentation of more information about that element (e.g., via a popup window), allow an operator to adjust parameters associated with the element, etc.

Figure 33:
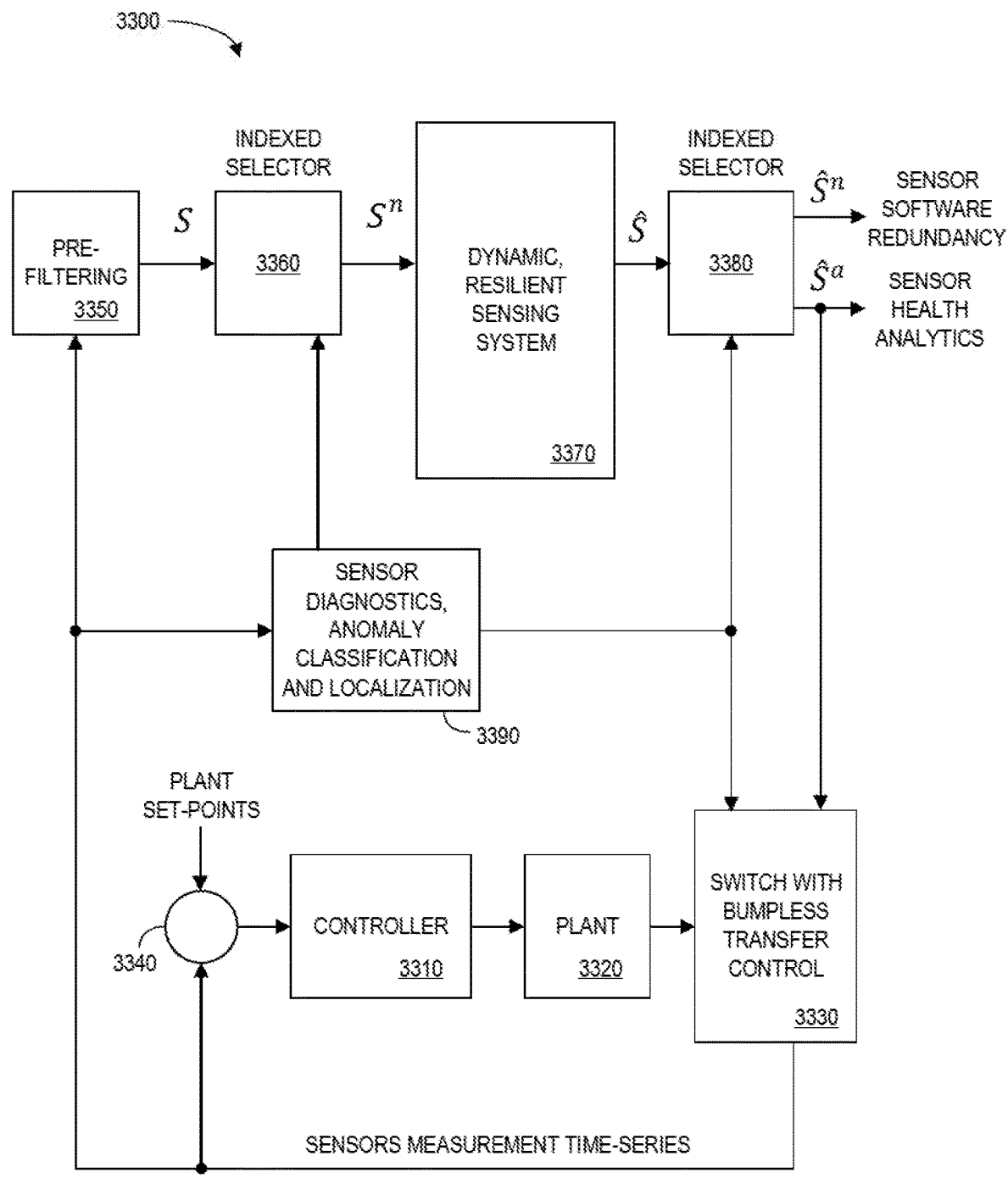
FIG. 33 is an autonomous reconfigurable virtual sensing system in accordance with some embodiments.

FIG. 33 shows a system 3300 that uses a dynamic, resilient sensing system 3370 in a controls and analytics platform. In particular, sensor measurement time-series values are combined 3340 with plant set-points and the result goes to a switch with bumpless transfer control 3330 via a controller 3310 and a plant 3320. The sensors measurements time-series values also undergo pre-filtering 3350 before being passed to the dynamic, resilient sensing system 3370 via a first indexed selector 3360. A second indexed selector 3380, controlled by sensor diagnostics and anomaly classification 3390 receives data from the dynamic, resilient sensing system 3370 and provides information for sensor software redundancy, sensor health analysis, and control of the switch 3330.

The healthy estimates of the abnormal sensors and their indices are the provided into the control loop and are used to replace of the original abnormal measurements. This is done through the switch with bumpless transfer control 3330 that might utilize any bumpless switching mechanism (such as a bumpless Proportional-Integral-Derivative ("PID"), a switched dynamic controller, a smooth transition controller, etc.). During normal operation, the switch 3330 is open and thus the plant sensor measurements are passed through the feedback loop.

When an anomaly is detected, the switch 3330 is closed and the virtual healthy estimated of the abnormal sensors are passed to the control feedback loop. The bumpless transfer control may help ensure smoothness of the signals during a transition and avoids abrupt (and potentially destabilizing) spikes in the control loop. The sensor measurement time-series may be a combination of the virtual sensor estimates (replacing the independently compromised sensors in accordance with any of the embodiments described herein) and the original plant sensors that are not independently compromised. This mechanism may help neutralize the effect of the abnormal measurements (which could be due to the abnormality of the sensor itself, such as a sensor fault, or a cyber-attack on the sensor) and maintains healthy operations of the plant. Note that the switch 3330 can be re-opened as soon as the plant status is back to normal (again with bumpless transfer control) or may remain latched in for some additional period time and opened after that delay. According to some embodiments, the estimates of the abnormal measurement are also used for further health analytics. The system 3300 may also produce estimates of healthy measurements in real-time. These estimates may remain in "stand-by" and when any of those sensors becomes abnormal the 3300 system can adopt a new configuration. According to some embodiments, these estimates also provide software redundancy to increase the reliability of plant operations.

Some embodiments described herein may provide systems and/or methods for autonomous reconfigurable virtual sensing to neutralize the effect of anomalies (e.g., cyber-attack or faults) in system measurements. Embodiments may provide correct estimates of compromised sensor measurements using uncompromised sensor measurements, thus replacing the comprised sensors with healthy virtual (or "soft") sensors. According to some embodiments, a dynamic, resilient estimator may get a portion of the sensor measurements that are healthy and uncompromised and then use that information to provide healthy estimations for the measurements of sensors that are compromised. Moreover, embodiments may improve cyber security and accommodate critical functionality associated with an industrial asset. Some embodiments may bypass signals from attacked sensors using estimated signals created using data from healthy sensors. This approach may allow for a correction mechanism to sustain the operations while alerting operators about a cyber-attack or fault.

Some embodiments may eliminate certain sensors to reduce costs (e.g., in a gas turbine one could replace low-speed and high-speed shaft speed sensors with virtual sensing). Moreover, embodiments may provide a surrogate backup for critical and/or unreliable sensors and improved control performance (by having more sensors available including those that may be difficult or expensive to directly measure). As a result, asset down-time because of cyber incents and faults may be limited to increase asset reliability and availability via software and algorithmic redundancy. Embodiments may also provide improved control performance by having more sensors available (including those difficult or expensive to directly measure) and may expand the model base and/or retrain a single model readily for an expanded attack surface.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as (but not limited to) dams, the power grid, autonomous vehicles, military devices, etc.

According to some embodiments, virtual sensor data may replace a corresponding sensor monitoring node when needed. According to other embodiments, similar approaches may be taken with respect to other types of monitoring nodes. For example, virtual data might replace an actuator monitoring node or a controller monitoring node that is currently experiencing an abnormality.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an industrial asset, comprising:
   a plurality of monitoring nodes, each monitoring node generating a series of current monitoring node values over time that represent a current operation of the industrial asset;
   an abnormality detection computer to determine that at least one abnormal monitoring node is currently being attacked or experiencing a fault; and
   a dynamic, resilient estimator, coupled to the plurality of monitoring nodes and the abnormality detection computer, including:
      a computer processor, and
      a computer memory storing instructions that, when executed by the computer processor, cause the dynamic, resilient estimator to:
         (i) split a temporal monitoring node space into a normal subspace and a plurality of abnormal subspaces, each abnormal subspace being associated with a different kind of attack vector, wherein each attack vector is associated with at least one abnormal monitoring node,
         (ii) construct a plurality of neutralization models, wherein each neutralization model is trained offline for a different kind of attack vector using a supervised learning technique capable of exploiting correlations in multiple dimensions, including temporal and across multiple sensors, and the associated abnormal subspace,
         (iii) responsive to a model selection recommendation, automatically invoke an appropriate neutralization model to determine estimated values of a particular abnormal monitoring node or nodes that are currently being attacked or experiencing a fault, wherein the invocation of the appropriate neutralization model is performed by a sensor data redirection switch located between: (1) a detection and localization module that generates the model selection recommendation based at least in part on a causality dependency matrix and the particular abnormal monitoring node or nodes that are currently being attacked or experiencing a fault, and (2) the plurality of neutralization models, and
         (iv) replace the series of current monitoring node values from the particular abnormal monitoring node or nodes with the estimated values to allow continuing the current operation of the industrial asset even when being attacked or experiencing a fault.

2. The system of claim 1, wherein at least one neutralization model is associated with at least one supervised learning technique.

3. The system of claim 1, wherein at least one neutralization model is associated with a generative network constructed on top of base models.

4. The system of claim 1, wherein the estimated values comprise supervised estimated values and the dynamic, resilient estimator is further to:
   construct, using only normal monitoring node values over time that represent a normal operation of the industrial asset, a latent feature space, of lower dimensionality as compared to the temporal monitoring node space, associated with latent features,
   construct, using only the normal monitoring node values over time that represent a normal operation of the industrial asset, functions to project monitoring node values into the latent feature space,
   responsive to an indication that the at least one abnormal monitoring node is currently being attacked or experiencing a fault, automatically compute optimal values of the latent features to minimize a reconstruction error associated with the monitoring nodes not currently being attacked or experiencing a fault, project the optimal values from the latent feature space back into the temporal monitoring node space to provide unsupervised estimated values of the at least one abnormal monitoring node currently being attacked or experiencing a fault, and selecting one of the supervised estimated values and the unsupervised estimated values to be used to replace the series of current monitoring node values from the particular abnormal monitoring node or nodes.

5. The system of claim 4, wherein the construction of the latent feature space is associated with feature extraction using unsupervised learning methods.

6. The system of claim 5, wherein the feature extraction is associated with a principal component analysis and a quadratic programming problem solved by an active set quadratic programming solver.

7. The system of claim 5, wherein the feature extraction is associated with a deep autoencoder and a nonlinear programming problem solved by a sequential quadratic programming solver.

8. The system of claim 1, wherein the dynamic, resilient estimator is associated with at least one of: (i) an indexed selector, (ii) bumpless transfer control, (iii) a proportional-integral-derivative controller, (iv) a switched dynamic control, and (v) a smooth transition controller.

9. The system of claim 1, wherein the industrial asset is associated with at least one of: (i) a turbine, (ii) a gas turbine, (iii) a wind turbine, (iv) an engine, (v) a jet engine, (vi) a locomotive engine, (vii) a refinery, (viii) a power grid, (ix) a dam, and (x) an autonomous vehicle.

10. A computerized method to protect an industrial asset associated with a plurality of monitoring nodes, each monitoring node generating a series of current monitoring node values over time that represent current operation of the industrial asset, comprising:

splitting, by a dynamic, resilient estimator, a temporal monitoring node space into a normal subspace and a plurality of abnormal subspaces, each abnormal subspace being associated with a different kind of attack vector, wherein each attack vector is associated with at least one abnormal monitoring node;

constructing a plurality of neutralization models, wherein each neutralization model is trained offline for a different kind of attack vector using a supervised learning technique capable of exploiting correlations in multiple dimensions, including temporal and across multiple sensors, and the associated abnormal subspace;

responsive to a model selection recommendation, automatically invoking an appropriate neutralization model to determine estimated values of a particular abnormal monitoring node or nodes that are currently being attacked or experiencing a fault, wherein the invocation of the appropriate neutralization model is performed by a sensor data redirection switch located between: (1) a detection and localization module that generates the model selection recommendation based at least in part on a causality dependency matrix and the particular abnormal monitoring node or nodes that are currently being attacked or experiencing a fault, and (2) the plurality of neutralization models; and replacing the series of current monitoring node values from the particular abnormal monitoring node or nodes with the estimated values to allow continuing the current operation of the industrial asset even when being attacked or experiencing a fault.

11. The computerized method of claim 10, wherein at least one neutralization model is associated with a generative network constructed on top of base models.

* * * * *